US012593199B2

(12) United States Patent
Jeong

(10) Patent No.: US 12,593,199 B2
(45) Date of Patent: Mar. 31, 2026

(54) METHOD AND APPARATUS FOR SL RELAY DISCOVERY IN WIRELESS COMMUNICATION SYSTEM

(71) Applicant: Samsung Electronics Co., Ltd., Suwon-si (KR)

(72) Inventor: Kyeongin Jeong, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 535 days.

(21) Appl. No.: 17/489,093

(22) Filed: Sep. 29, 2021

(65) Prior Publication Data

US 2022/0109970 A1      Apr. 7, 2022

Related U.S. Application Data

(60) Provisional application No. 63/166,745, filed on Mar. 26, 2021, provisional application No. 63/086,998, filed on Oct. 2, 2020.

(51) Int. Cl.
*H04W 40/24* (2009.01)
*H04L 5/00* (2006.01)
(Continued)

(52) U.S. Cl.
CPC ........... *H04W 8/005* (2013.01); *H04W 72/02* (2013.01); *H04W 92/18* (2013.01)

(58) Field of Classification Search
CPC ..... H04W 88/04; H04W 24/02; H04W 40/24; H04W 4/40; H04W 88/02; H04W 72/25;
(Continued)

(56) References Cited

U.S. PATENT DOCUMENTS

2017/0126306 A1    5/2017    Kim et al.
2017/0245245 A1    8/2017    Kim et al.
(Continued)

FOREIGN PATENT DOCUMENTS

CN        106576354 A      4/2017
WO     2018/208114 A1    11/2018

OTHER PUBLICATIONS

"3rd Generation Partnership Project; Technical Specification Group Radio Access Network; NR; Physical channels and modulation (Release 16)", 3GPP TS 38.211 V16.1.0, Mar. 2020, 130 pages.
(Continued)

*Primary Examiner* — Marcus Smith
*Assistant Examiner* — Jason A Harley

(57) ABSTRACT

Methods and apparatuses in a wireless communication system. A method of operating a user equipment (UE) comprises: identifying a first resource pool for a sidelink (SL) relay discovery operation and a second resource pool for other SL transmission and reception operations; determining whether a signal transmission or reception is for the SL relay discovery operation or for the other SL transmission and reception operations; selecting the first resource pool for the signal transmission or reception based on a determination that the signal transmission or reception is for the SL relay discovery operation; and selecting the second resource pool for the signal transmission or reception based on a determination that the signal transmission or reception is for the other SL transmission and reception operations; and performing the signal transmission or reception using the selected one of the first and second resource pools.

15 Claims, 15 Drawing Sheets

(51) Int. Cl.

| | |
|---|---|
| *H04W 8/00* | (2009.01) |
| *H04W 72/02* | (2009.01) |
| *H04W 72/04* | (2023.01) |
| *H04W 72/25* | (2023.01) |
| *H04W 72/40* | (2023.01) |
| *H04W 72/563* | (2023.01) |
| *H04W 92/18* | (2009.01) |

(58) Field of Classification Search
CPC .... H04W 28/26; H04W 72/40; H04B 17/318; H04B 7/15542; H04B 1/3822
USPC .............................................. 455/39; 370/252
See application file for complete search history.

(56) References Cited

U.S. PATENT DOCUMENTS

| | | | | |
|---|---|---|---|---|
| 2017/0359766 | A1* | 12/2017 | Agiwal | H04L 5/0048 |
| 2018/0054804 | A1 | 2/2018 | Luo et al. | |
| 2018/0084442 | A1* | 3/2018 | Lee | H04W 76/27 |
| 2019/0044667 | A1* | 2/2019 | Guo | H04L 1/1822 |
| 2019/0159224 | A1 | 5/2019 | Yasukawa et al. | |
| 2019/0356400 | A1* | 11/2019 | Muraoka | H04B 17/318 |
| 2019/0373652 | A1* | 12/2019 | Hong | H04W 76/14 |
| 2020/0100088 | A1 | 3/2020 | Kim et al. | |
| 2020/0178343 | A1* | 6/2020 | Kim | H04W 76/27 |
| 2020/0389900 | A1 | 12/2020 | Lee et al. | |
| 2021/0168814 | A1* | 6/2021 | Chen | H04W 72/02 |
| 2022/0338000 | A1* | 10/2022 | Lee | H04W 12/71 |

OTHER PUBLICATIONS

"3rd Generation Partnership Project; Technical Specification Group Radio Access Network; NR; Multiplexing and channel coding (Release 16)", 3GPP TS 38.212 V16.1.0, Mar. 2020, 146 pages.

"3rd Generation Partnership Project; Technical Specification Group Radio Access Network; NR; Physical layer procedures for control (Release 16)" 3GPP TS 38.213 V16.1.0, Mar. 2020, 156 pages.

"3rd Generation Partnership Project; Technical Specification Group Radio Access Network; NR; Physical layer procedures for data (Release 16)", 3GPP TS 38.214 V16.1.0, Mar. 2020, 151 pages.

"3rd Generation Partnership Project; Technical Specification Group Radio Access Network; NR; Physical layer measurements (Release 16)", 3GPP TS 38.215 v16.1.0, Mar. 2020, 22 pages.

"3rd Generation Partnership Project; Technical Specification Group Radio Access Network; NR; Medium Access Control (MAC) protocol specification (Release 16)", 3GPP TS 38.321 v16.0.0, Mar. 2020, 141 pages.

"3rd Generation Partnership Project; Technical Specification Group Radio Access Network; NR; Radio Link Control (RLC) protocol specification (Release 16)", 3GPP TS 38.322 V16.0.0, Mar. 2020, 33 pages.

"3rd Generation Partnership Project; Technical Specification Group Radio Access Network; NR; Packet Data Convergence Protocol (PDCP) specification (Release 16)", 3GPP TS 38.323 V16.0.0, Mar. 2020, 37 pages.

"3rd Generation Partnership Project; Technical Specification Group Radio Access Network; E-UTRA and NR; Service Data Adaptation Protocol (SDAP) specification (Release 16)", 3GPP TS 37.324 V16.0.0, Mar. 2020, 16 pages.

"3rd Generation Partnership Project; Technical Specification Group Radio Access Network; NR; Radio Resource Control (RRC) protocol specification (Release 16)", 3GPP TS 38.331 v16.0.0, Mar. 2020, 835 pages.

"3rd Generation Partnership Project; Technical Specification Group Radio Access Network; NR; Study on NR Vehicle-to-Everything (V2X) (Release 16)", 3GPP TR 38.885 V16.0.0, Mar. 2019, 122 pages.

"3rd Generation Partnership Project; Technical Specification Group Radio Access Network; Study on NR sidelink relay: (Release 17)", 3GPP TR 38.836 V0.1.0, Sep. 2020, 16 pages.

"Universal Mobile Telecommunications System (UMTS); LTE; Proximity-based services (ProSe); Stage 2 (3GPP TS 23.303 version 16.0.0 Release 16)", Jul. 2020, 133 pages.

International Search Report and Written Opinion of the International Searching Authority in connection with International Application No. PCT/KR2021/013542 issued Jan. 6, 2022, 7 pages.

Qualcomm Incorporated, "Discussion on relay discovery model / procedure", 3GPP TSG RAN WG2 Meeting #111-e, R2-2006556, E-Conference, Aug. 17-28, 2020, 6 pages.

InterDigital Inc., "Discovery procedure for SL relay", 3GPP RAN WG2 Meeting #111-e, R2-2006761, Electronic, Aug. 17-28, 2020, 4 pages.

Samsung Electronics, "Sidelink relay discovery model and procedure", 3GPP TSG-RAN WG2 Meeting #111-e, R2-2006969, Online, Aug. 17-28, 2020, 3 pages.

Extended European Search Report issued Feb. 12, 2024 regarding Application No. 21876060.1, 12 pages.

ZTE (Rapporteur), "Report of email discussion [90#25][LTE/ProSe] Relay UE initiation, discovery and selection/re-selection", 3GPP TSG-RAN WG2 Meeting #91, R2-153764, Aug. 2015, 41 pages.

Chinese National Intellectual Property Administration, Office Action issued Aug. 29, 2025 regarding Application No. 202180067566.4, 18 pages.

* cited by examiner

900

METHOD AND APPARATUS FOR SL RELAY DISCOVERY IN WIRELESS COMMUNICATION SYSTEM

CROSS-REFERENCE TO RELATED APPLICATIONS AND CLAIM OF PRIORITY

The present application claims priority to U.S. Provisional Patent Application No. 63/086,998, filed on Oct. 2, 2020, and U.S. Provisional Patent Application No. 63/166,745, filed on Mar. 26, 2021. The content of the above-identified patent document is incorporated herein by reference.

TECHNICAL FIELD

The present disclosure relates generally to wireless communication systems and, more specifically, the present disclosure relates to sidelink (SL) relay discovery operation in a wireless communication system.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates SL relay discovery operation.

In one embodiment, a user equipment (UE) in a wireless communication system is provided. The UE comprises a processor configured to: identify a first resource pool for a SL relay discovery operation and a second resource pool for other SL transmission and reception operations; determine whether a signal transmission or reception is for the SL relay discovery operation or for the other SL transmission and reception operations; select the first resource pool for the signal transmission or reception based on a determination that the signal transmission or reception is for the SL relay discovery operation; and select the second resource pool for the signal transmission or reception based on a determination that the signal transmission or reception is for the other SL transmission and reception operations. The UE further comprises a transceiver operably coupled to the processor, the transceiver configured to perform the signal transmission or reception using the selected one of the first and second resource pools.

In another embodiment, a method of a UE in a wireless communication system is provided. The method comprises: identifying a first resource pool for a SL relay discovery operation and a second resource pool for other SL transmission and reception operations; determining whether a signal transmission or reception is for the SL relay discovery operation or for the other SL transmission and reception operations; selecting the first resource pool for the signal transmission or reception based on a determination that the signal transmission or reception is for the SL relay discovery operation; and selecting the second resource pool for the signal transmission or reception based on a determination that the signal transmission or reception is for the other SL transmission and reception operations; and performing the signal transmission or reception using the selected one of the first and second resource pools.

In yet another embodiment, a base station (BS) in a wireless communication system, the BS comprises a processor configured to generate a first resource pool for a SL relay discovery operation and a second resource pool for other SL transmission and reception operations. The BS further comprises a transceiver operably coupled to the processor, the transceiver configured to transmit information including the first resource pool for the SL relay discovery operation and the second resource pool for the other SL transmission and reception operations, wherein: the first resource pool is selected for a signal transmission or reception for the SL relay discovery operation; and the second resource pool is selected for the signal transmission or reception for the other SL transmission and reception operations.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v.16.1.0, "Physical channels and modulation"; 3GPP TS 38.212 v.16.1.0, "Multiplexing and channel coding"; 3GPP TS 38.213 v16.1.0, "NR; Physical Layer Procedures for Control"; 3GPP TS 38.214: v.16.1.0, "Physical layer procedures for data"; 3GPP TS 38.215 v.16.1.0 "Physical layer measurements"; 3GPP TS 38.321 v16.0.0, "Medium Access Control (MAC) protocol specification"; 3GPP TS 38.322 v.16.0.0, "Radio Link Control (RLC) protocol specification"; 3GPP TS 38.323 v.16.0.0, "Packet Data Convergence Protocol (PDCP) specification"; 3GPP TS 38.331 v.16.0.0, "Radio Resource Control (RRC) protocol specification"; 3GPP TS 37.324 v.16.0.0, "Service Data Adaptation Protocol (SDAP) specification"; 3GPP TR 38.836 v.0.1.0, "Study on NR sidelink relay"; 3GPP TS 23.303 v.16.0.0, "Proximity-based services (ProSe) stage 2'" and 3GPP TR 38.885 v.16.0.0, "Study on NR Vehicle-to-Everything (V2X)."

Figure 1:
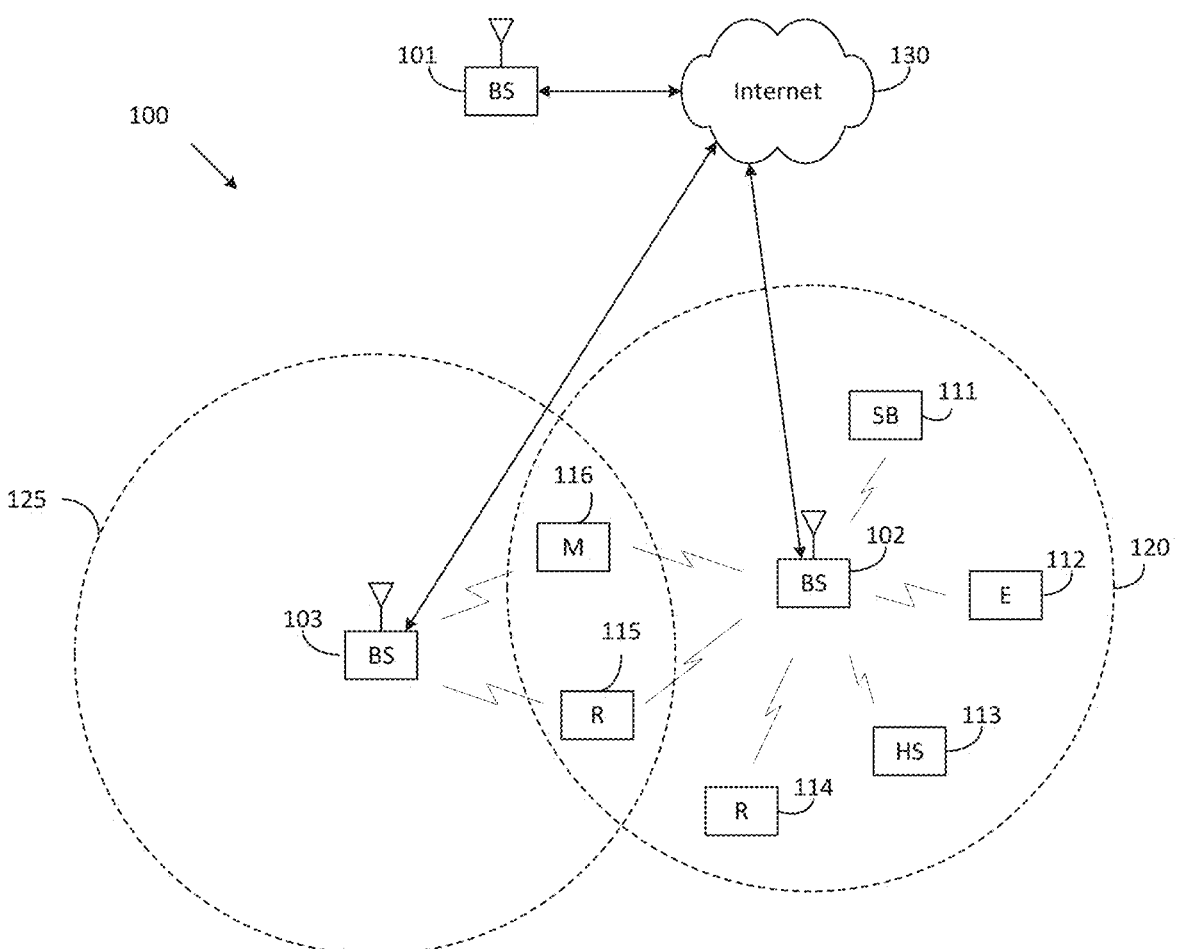
FIG. 1 illustrates an example wireless network according to embodiments of the present disclosure.
Figure 2:
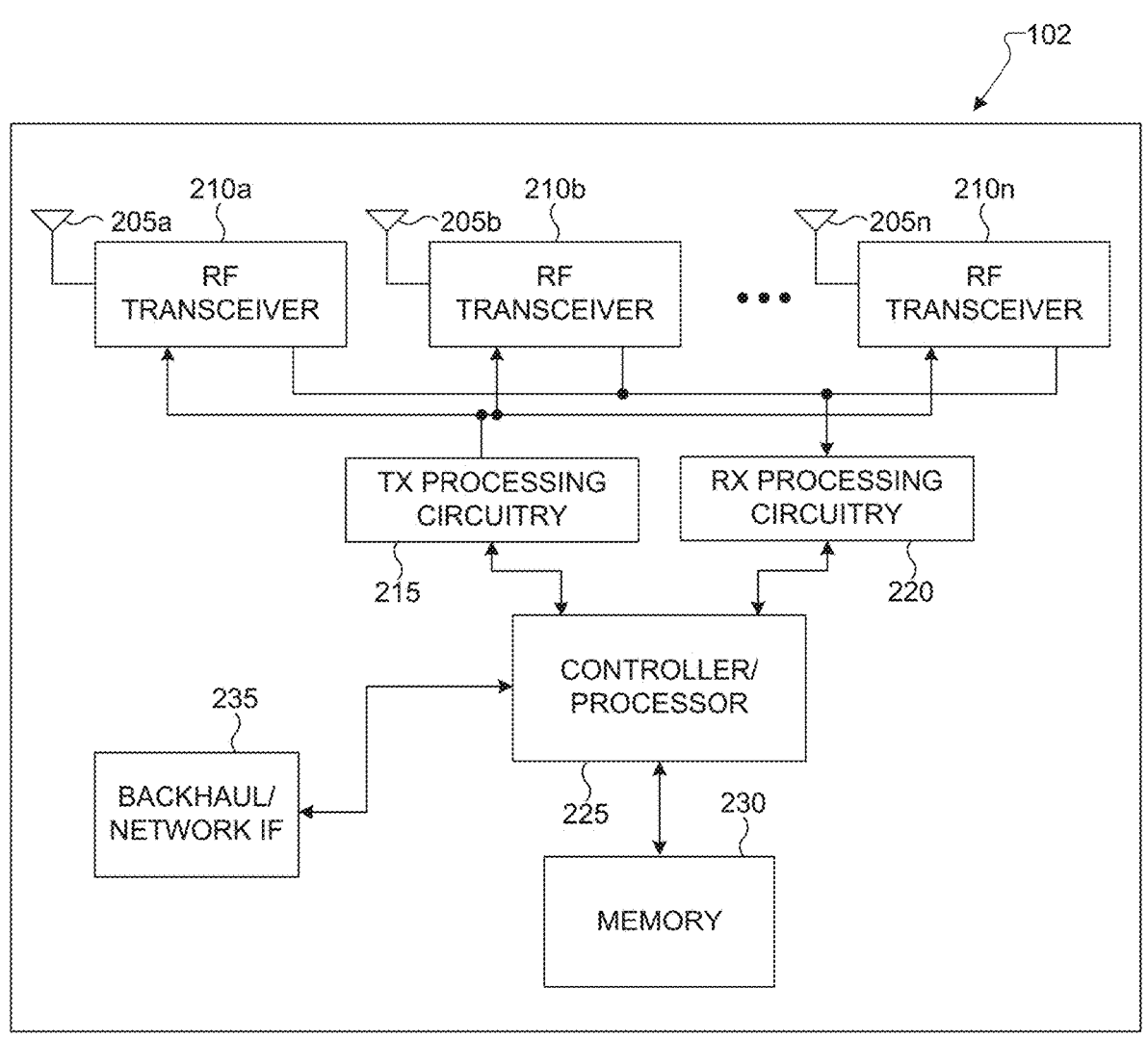
FIG. 2 illustrates an example gNB according to embodiments of the present disclosure.
Figure 3:
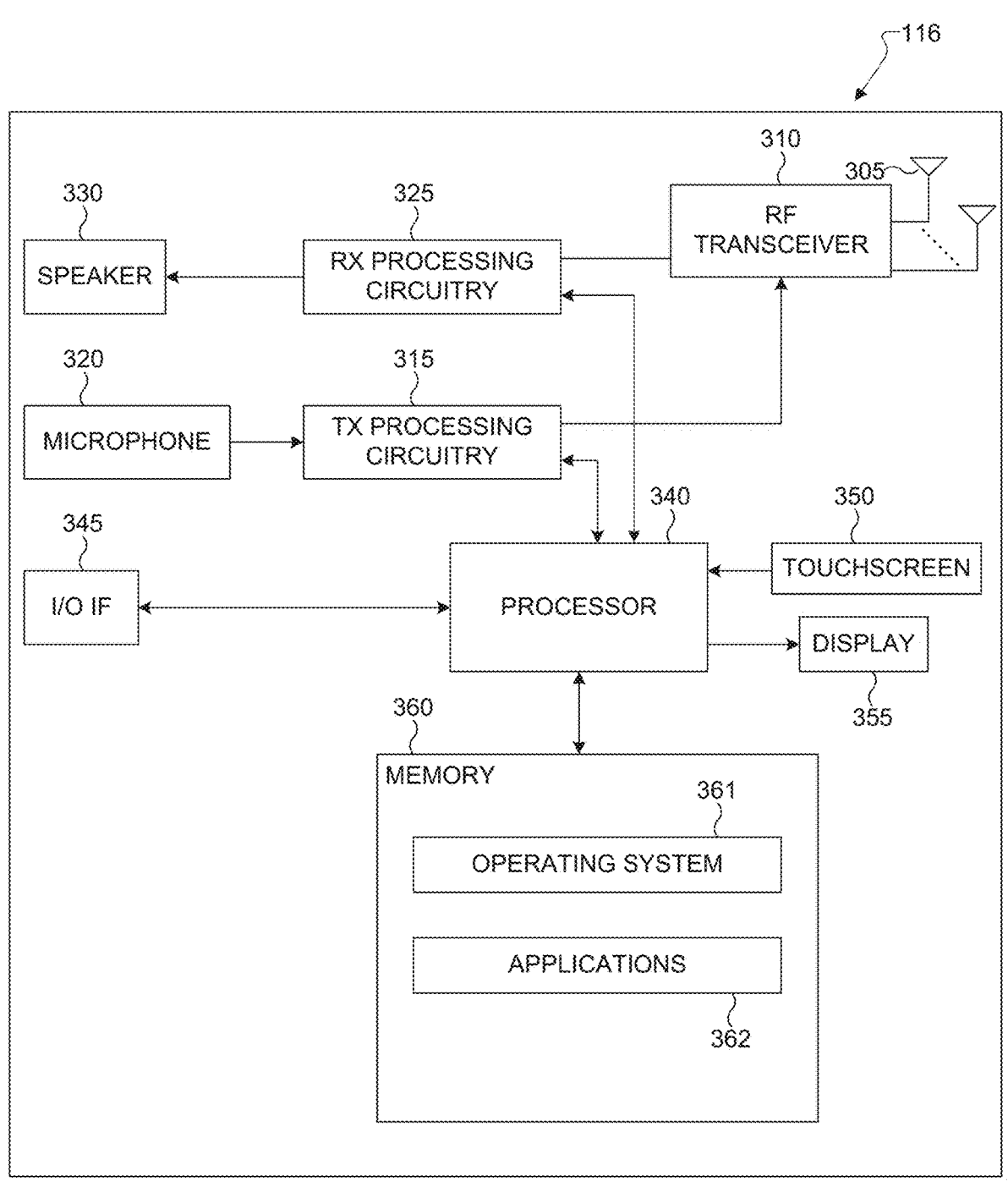
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of UEs within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3rd generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for SL relay discovery operation. In certain embodiments, and one or more of the gNBs 101-103 includes circuitry, programing, or a combination thereof, for SL relay discovery operation.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support the SL relay discovery operation. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for SL relay discovery operation. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

A communication system includes a downlink (DL) that refers to transmissions from a base station or one or more transmission points to UEs and an uplink (UL) that refers to transmissions from UEs to a base station or to one or more reception points.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of subcarriers (SCs). For example, a slot can have duration of 0.5 milliseconds or 1 millisecond, include 14 symbols and an RB can include 12 SCs with inter-SC spacing of 15 KHz or 30 KHz, and so on.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. For brevity, a DCI format scheduling a PDSCH reception by a UE is referred to as a DL DCI format and a DCI format scheduling a physical uplink shared channel (PUSCH) transmission from a UE is referred to as an UL DCI format.

A gNB transmits one or more of multiple types of RS including channel state information RS (CSI-RS) and demodulation RS (DMRS). A CSI-RS is primarily intended for UEs to perform measurements and provide CSI to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process includes NZP CSI-RS and CSI-IM resources.

A UE can determine CSI-RS transmission parameters through DL control signaling or higher layer signaling, such as radio resource control (RRC) signaling, from a gNB. Transmission instances of a CSI-RS can be indicated by DL control signaling or be configured by higher layer signaling. A DMRS is transmitted only in the BW of a respective PDCCH or PDSCH and a UE can use the DMRS to demodulate data or control information.

Figures 4, 5:
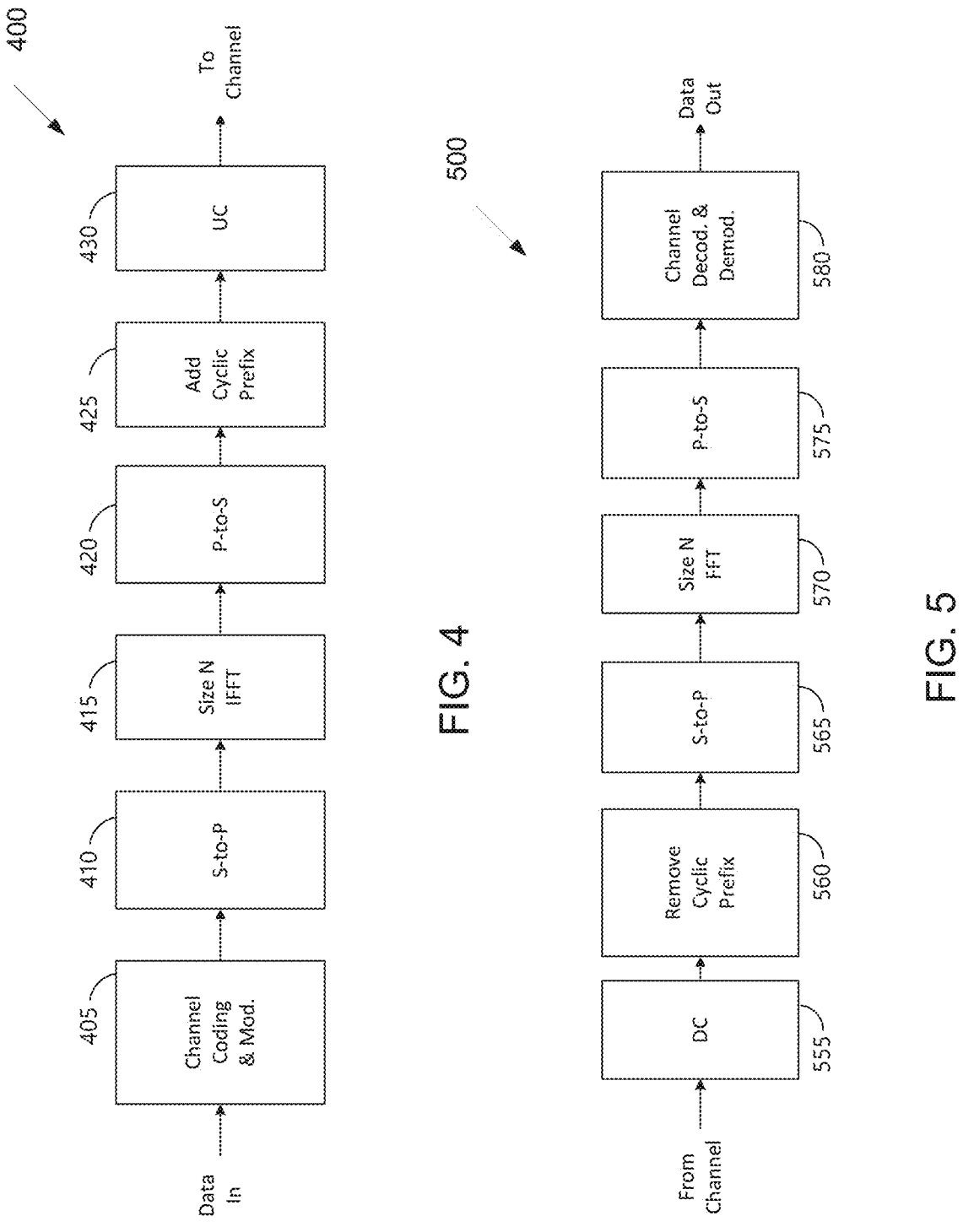
FIGS. 4 and 5 illustrate example wireless transmit and receive paths according to this disclosure.

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the receive path 500 is configured to support sidelink measurements in V2X communication as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as demultiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

In 3GPP wireless standards, NR has been being discussed as a 5G wireless communication. One of NR features under the discussion is V2X.

Figures 6, 7A, 7B:
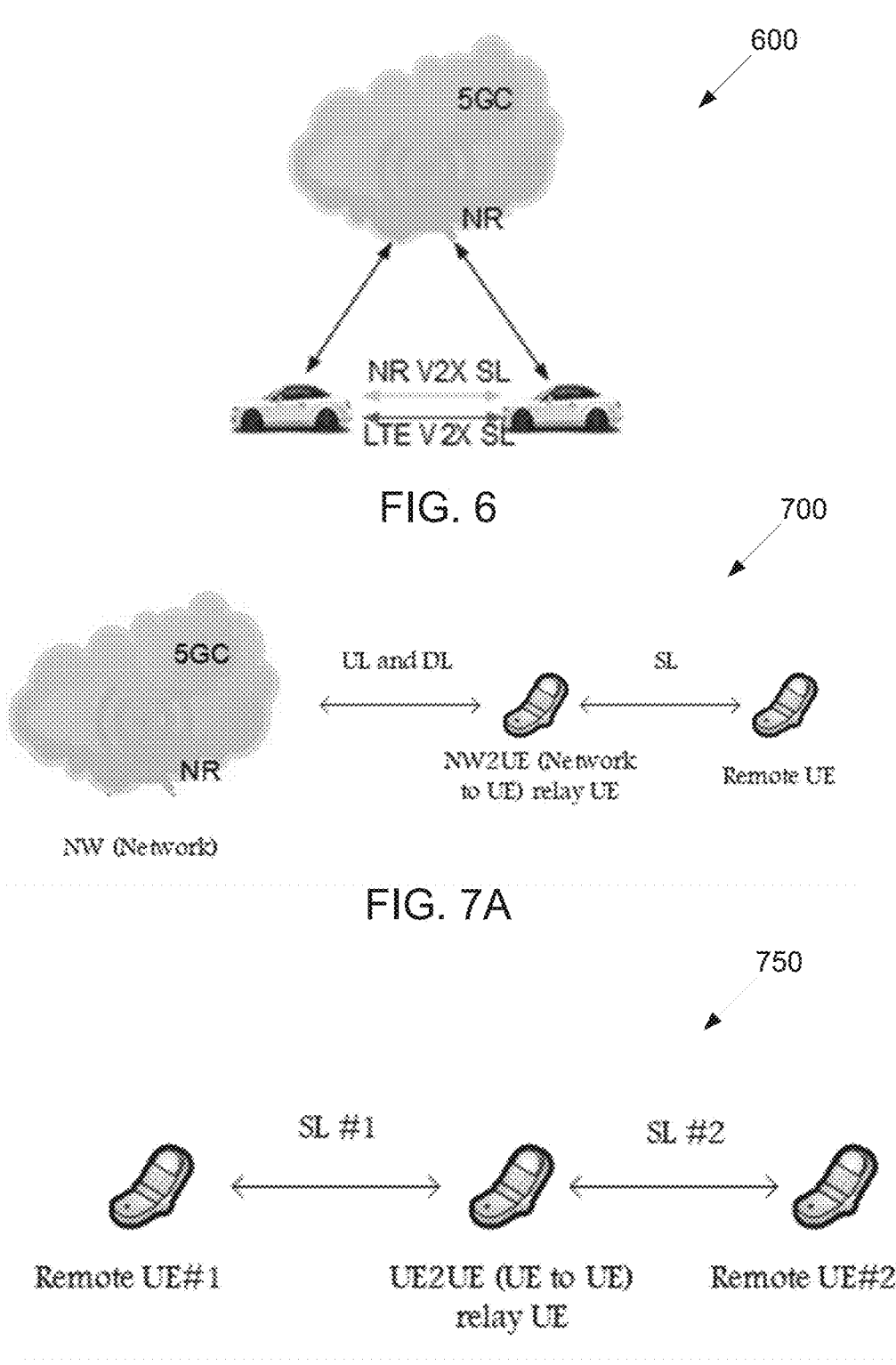
FIG. 6 illustrates an example V2X communication over sidelink according to embodiments of the present disclosure.
FIG. 7A illustrates an example UE2NW relay operation according to embodiments of the present disclosure.
FIG. 7B illustrates an example UE2UE relay operation according to embodiments of the present disclosure.

FIG. 6 illustrate an example V2X communication over sidelink 600 according to embodiments of the present disclosure. An embodiment of the V2X communication over sidelink 600 shown in FIG. 6 is for illustration only.

FIG. 6 illustrates an example scenario of vehicle to vehicle communication. Two or multiple vehicles can transmit and receive data/control over direct link/interface between vehicles. The direct link/interface between vehicles or between vehicle and other things is named as a sidelink (SL) in 3GPP. Note that the FIG. 6 describes the scenario where the vehicles still can communicate with a gNB in order to acquire SL resources, SL radio bearer configurations, etc., however it is also possible even without interaction with the gNB, vehicles still communicate each other over the SL. In the case, the SL resources, the SL radio bearer configurations, etc., are preconfigured (e.g., via V2X server or any other core network entity).

In 3rd generation partnership project (3GPP) wireless standards, new radio access technology (NR) is discussed as 5G wireless communication. One of NR features under the discussion is vehicle-to-everything (V2X).

FIG. 6 illustrates an example V2X communication over sidelink 600 according to embodiments of the present disclosure. An embodiment of the V2X communication over sidelink 600 shown in FIG. 6 is for illustration only.

FIG. 6 illustrates the example scenario of vehicle to vehicle communication. Two or multiple vehicles can transmit and receive data/control over direct link/interface between vehicles. The direct link/interface between vehicles or between vehicle and other thing (e.g., pedestrian device or any device related to transportation system) or between other things is named as SL (Sidelink) in 3GPP.

In various embodiments, the vehicles communicate each other and the vehicles are located in in-coverage of NR network. Vehicles communicate with the gNB in order to acquire SL related resource information (e.g., SL resource pool configuration, etc.), SL radio bearer configurations (SL medium access control (MAC), radio link control (RLC), packet data convergence protocol (PDCP), service data adaptation protocol (SDAP), radio resource control (RRC) related configurations), etc.

The vehicles transmit/receive the data/control each other over SL once the vehicles acquire SL related configurations from the gNB. It notes that it is also possible even without interaction with the gNB (e.g., vehicles are located in out-of-coverage of NR network), vehicles still communicate each other over SL. In the case, SL resources, SL radio bearer configuration, etc. are preconfigured (e.g., via V2X server or any other core network entity). For more detailed V2X scenarios and studies are captured in 3GPP standard specification.

For SL communication, the radio interface layer 1/layer 2/layer 3 (L1/L2/L3) protocols comprise, as specified in 3GPP standard specification, physical (PHY) protocol, MAC, RLC, PDCP, RRC, and SDAP.

In 3rd generation partnership project (3GPP) wireless standards, new radio access technology (NR) is discussed as 5G wireless communication. One of NR features is vehicle-to-everything V2X).

FIG. 6 describes the example scenario of vehicle to vehicle communication. Two or multiple vehicles can transmit and receive data/control over direct link/interface between vehicles. The direct link/interface between vehicles or between vehicle and other thing (e.g., pedestrian device or any device related to transportation system) or between other things is named as SL in 3GPP. FIG. 6 describes one example scenario where the vehicles communicate each other and the vehicles are located in in-coverage of NR network. Vehicles communicate with the gNB in order to acquire SL related resource information (e.g., SL resource pool configuration, etc.), SL radio bearer configurations (SL MAC, RLC, PDCP, SDAP, RRC related configurations), etc. The vehicles transmit/receive the data/control each other over SL once the vehicles acquire SL related configurations from the gNB. Note it is also possible even without interaction with the gNB (e.g., vehicles are located in out-of-coverage of NR network), vehicles still communicate each other over SL. In the case, SL resources, SL radio bearer configuration, etc. are preconfigured (e.g., via V2X server or any other core network entity).

It is noted that FIG. 6 describes the scenario where the vehicles still can communicate with gNB in order to acquire SL resource, SL radio bearer configurations, etc., however it is also possible even without interaction with gNB, vehicles still communicate each other over SL. In the case, SL resource, SL radio bearer configuration, etc. are preconfigured (e.g., via V2X server or any other core network entity).

One of main difference compared to UL (e.g., a link from a UE to a gNB) is the resource allocation mechanism for transmission. In UL, the resource for transmission is allocated by the gNB, however in SL, the UE itself selects a resource within the SL resource pool, which is configured by the gNB and selected by the UE if multiple SL resource pools are configured, based on UE's channel sensing result and the required number of resources for data/control transmission.

In addition to the basic V2X communication over SL in Rel-16, SL relay function will be introduced in Rel-17 of 3GPP standard specification.

FIG. 7A illustrates an example UE2NW relay operation 700 according to embodiments of the present disclosure. An embodiment of the UE2NW relay operation 700 shown in FIG. 7A is for illustration only.

FIG. 7B illustrates an example UE2UE relay operation 750 according to embodiments of the present disclosure. An embodiment of the UE2UE relay operation 750 shown in FIG. 7B is for illustration only.

FIGS. 7A and 7B describes the example scenarios where SL relay is applied. In FIG. 7A, a remote UE can transmit and/or receive data with network via UE to network (UE2NW) relay UE. For data from the remote UE to the network, the remote UE first sends data to the UE2NW relay UE over SL then the UE2NW relay UE relayed the received data to the network over UL. For data from the network to the remote UE, the network first sends data to the UE2NW relay UE over DL then the UE2NW relay UE relayed the received data to the remote UE over SL.

In FIG. 7B, the remote UE #1 and the remote UE #2 can transmit and/or receive data each other via a UE to UE (UE 2UE) relay UE. For data from the remote UE #1 to the remote UE #2, the remote UE #1 first sends data to UE 2UE relay UE over SL #1 then UE 2UE relay UE relayed the received data to the remote UE #2 over SL #2. For data from the remote UE #2 to the remote UE #1, the remote UE #2 first sends data to the UE 2UE relay UE over SL #2 then the UE 2UE relay UE relayed the received data to the remote UE #1 over SL #1.

In one embodiment, a layer-2 relay and a layer-3 relay are provided. For an L2 UE 2NW relay, the adaptation layer is placed over an RLC sublayer for both CP and UP at the Uu interface between a relay UE and a gNB and/or at the SL interface between a remote UE and a relay UE. The Uu SDAP/PDCP and RRC are terminated between a remote UE and a gNB, while RLC, MAC, and PHY are terminated in each link (i.e., the link between a remote UE and a UE-to-network relay UE and the link between a UE-to-network relay UE and a gNB).

The adaptation layer enables bearer mapping between the bearer between the remote UE and the UE 2NW relay UE and the bearer between the UE 2NW relay UE and the gNB.

For an L3 UE 2NW relay, the adaptation layer is placed over an SDAP sublayer for both CP and UP at the Uu interface between a relay UE and a gNB and/or at the SL interface between a remote UE and a relay UE. Likewise, for an L2 UE 2UE relay, the adaptation layer is placed over an RLC sublayer for both CP and UP at the second SL interface between the relay UE and the destination remote UE and/or at the SL interface between a source remote UE and the relay UE and for an L3 UE 2UE relay, the adaptation layer is placed over an SDAP sublayer for both CP and UP at the second SL interface between the relay UE and the destination remote UE and/or at the SL interface between source remote UE and the relay UE.

The adaptation layer enables bearer mapping between the bearer between the source remote UE and the UE 2UE relay UE and the bearer between the UE 2UE relay UE and the destination remote UE. It is noted that a user plane radio protocol stack includes a physical sub-layer, a MAC sub-layer, an RLC sub-layer, a PDCP sub-layer, and an SDAP sub-layer.

A control plane radio protocol stack includes a physical sub-layer, a MAC sub-layer, an RLC sub-layer, a PDCP sub-layer, and an RRC sub-layer).

Figure 8:
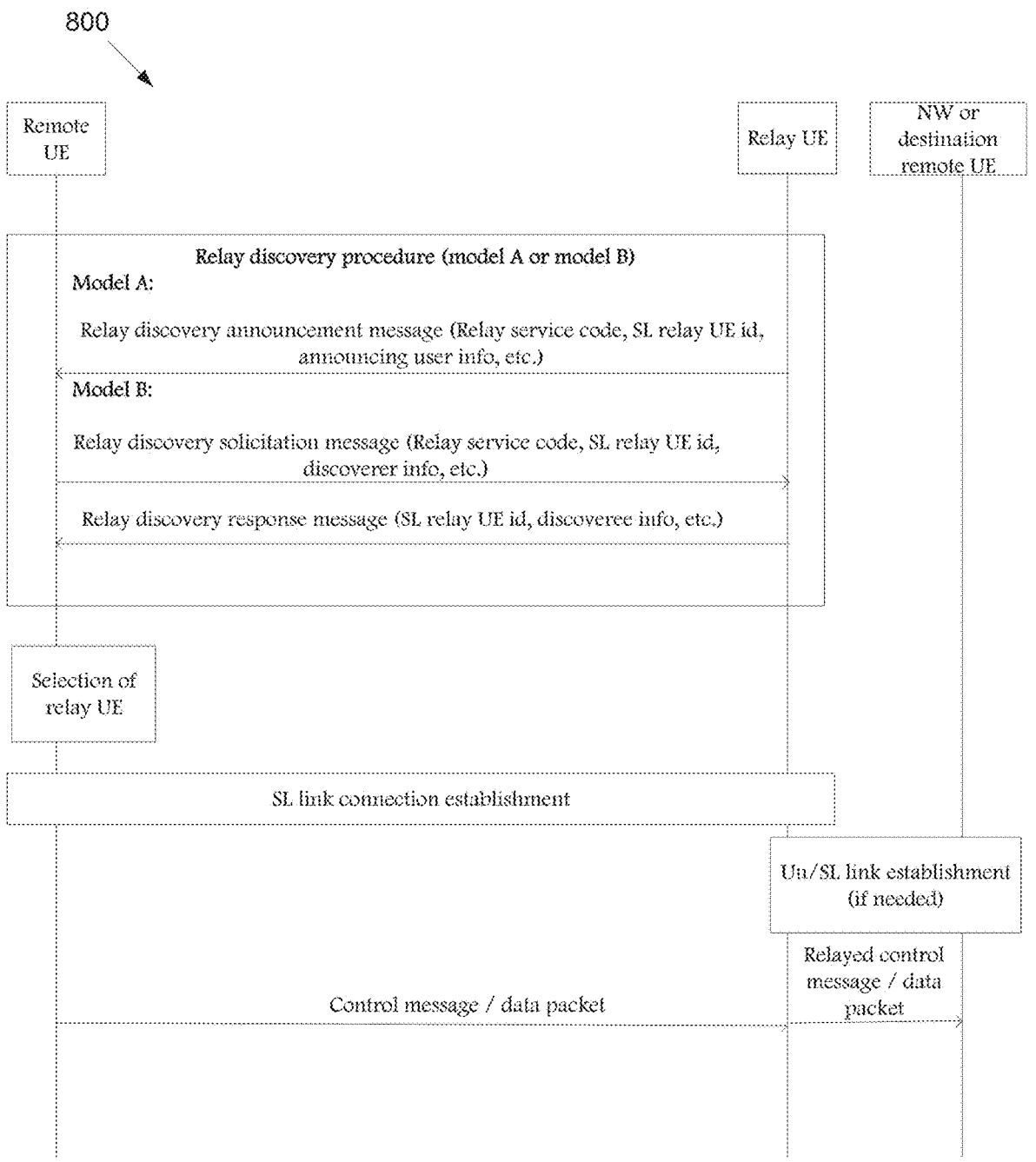
FIG. 8 illustrates an example signaling flow for SL relay procedure according to embodiments of the present disclosure.

FIG. 8 illustrates an example signaling flow 800 for SL relay procedure according to embodiments of the present disclosure. The signaling flow 800 as may be performed by UEs (e.g., 111-116 as illustrated in FIG. 1). An embodiment of the signaling flow 800 shown in FIG. 8 is for illustration only. One or more of the components illustrated in FIG. 8 can be implemented in specialized circuitry configured to perform the noted functions or one or more of the components can be implemented by one or more processors executing instructions to perform the noted functions.

FIG. 8 describes one example of SL relay procedure. A first SL remote UE needs to find out an SL relay UE in its proximity by an SL relay discovery procedure. The SL relay discovery procedure can be performed by either model A or model B. In model A, the SL relay UE sends an SL relay discovery announcement message periodically so if the SL remote UE is in SL relay UE proximity, the SL remote UE can be aware of the SL relay UE by reception of the SL relay discovery announcement message. The SL relay discovery announcement message can include a relay service code, an SL relay UE identification (ID), and announcing user information.

In one example, relay service code (RSC) may be a parameter identifying a connectivity service the SL relay UE provides. The RSCs are (pre)configured in a SL relay UE. Additionally, the RSC also identifies authorized users the SL relay may offer service to and may select the related security policies or information e.g., necessary for authentication and authorization between the SL remote UE and the SL Relay UE (e.g., an RSC for relays for police members only may be different than an RSC for relays for fire fighters only, even though potentially they provided connectivity to same APN e.g., to support internet access).

In one example, an SL relay UE ID may be a link layer identifier that is used for direct communication and is associated with an RSC. A SL relay UE has a distinct SL relay UE ID for each RSC. For support of multiple PDN connections, the SL relay UE can be assigned a different SL relay UE ID for each PDN Connection.

In one example, announcer info. provides information about the announcing user.

In model B, the SL remote UE sends an SL relay discovery solicitation message first and if the corresponding SL relay UE in the SL remote UE 's proximity receives this SL relay discovery solicitation message, the SL relay UE sends an SL relay discovery response message back to the SL remote UE. The SL relay discovery solicitation message includes a relay service code, an SL relay UE ID, and discoverer information.

In one example, RSC may provide information about connectivity service that the discoverer UE is interested in. The RSC are (pre)configured in the SL remote UEs interested in related connectivity services.

In one example, ProSe relay UE ID may be a link layer identifier of a SL relay UE that is used for direct communication and is associated with an RSC. An SL relay UE has a distinct SL relay UE ID for each RSC. The SL relay UE ID is optional.

In one example, discoverer Info. provides information about the discoverer user.

Relay discovery response message includes a relay SL relay UE ID and discoveree information.

An SL relay UE ID may be a link layer identifier that is used for direct communication and is associated with a Relay Service Code. A SL relay UE has a distinct SL relay UE ID for each RSC.

In one example, discoveree info. provides information about the discoveree, i.e., the device to be discovered.

It may be note that an SL relay discovery announcing message and/or an SL relay discovery solicitation/SL relay discovery response message can be a control information message in radio interface protocol (e.g., RRC) or an upper layer control information message (e.g., ProSe (e.g., proximity service) sub-layer, V2X layer, etc.). Once the SL remote UE finds out the corresponding SL relay UE by SL relay discovery procedure, the SL remote UE selects the SL relay UE and performs SL link connection establishment with the selected SL relay UE. If needed, the SL relay UE needs to perform Uu or SL link establishment to the gNB or the destination SL remote UE. Then the SL remote UE 's control message and/or data packet which is destined to the network (NW) or the destination SL remote UE can be relayed by the SL relay UE.

As aforementioned, multiple kinds of relay UEs can exist so that a mechanism to link the appropriate SL relay UE and the remote UEs is needed. In one example, an SL relay discovery announcement message and/or SL relay discovery solicitation message/SL relay discovery response message include additional information to inform whether the announcing relay UE is an L2 relay UE or an L3 relay UE and whether the announcing relay UE is a UE 2NW relay UE or a UE 2UE relay UE.

In another example, an RSC or an SL relay UE ID is associated to the certain type of relay. For instance, when the RSC or the SL relay UE ID is (pre)configured to the SL relay UE and/or the remote UE according to the connectivity service it is interested, the RSC or the SL relay UE ID is linked only to single kind of SL relay, e.g., only one of an L2 UE 2NW relay UE, an L3 UE 2NW relay UE, an L2 UE 2UE relay UE, or an L3 UE 2UE relay UE.

It may be assumed that RSC #100 is (pre)configured for public safety application for firefighters then only single kind of SL relay UE (e.g., L2 UE 2UE relay UE) can be used with RSC #100. Then all remote UEs and relay UEs for RSC #100 may use the same kind of SL relay UE. This linkage between the RSC/SL relay UE ID and kind of SL relay UE can be either fixed or (pre)configured together (e.g., indication to distinguish what kind of SL relay UE is also (pre)configured when RSC/SL relay UE ID is (pre)configured in the SL relay UEs and the remote UEs.

In one example, separate SL resource(s) or SL resource pool(s) may be configured for a transmission and/or reception of SL relay discovery messages (e.g., an SL relay discovery announcement message, an SL relay discovery solicitation message, and an SL relay discovery response message).

The SL resource(s) or SL resource pool(s) can be either pre-configured or configured by a gNB. The SL relay UEs and the remote UEs transmit SL relay discovery messages and/or monitor SL relay discovery messages over the corresponding SL resource(s) or SL resource pool(s) according to the (pre)configuration. For example, if SL resource pool #A is (pre)configured for SL relay discovery for an L3 UE 2NW relay UE and SL resource pool #B is (pre)configured for SL relay discovery for an L2 UE 2UE relay UE, all L3 UE 2NW relay UEs and the remote UEs who seek for L3 UE 2NW relay UEs use SL resource pool #A for SL relay discovery (for transmission and/or monitoring of SL relay discovery messages) while all L2 UE 2UE relay UEs and the remote UEs who seek for L2 UE 2UE relay UEs use SL resource pool #B for SL relay discovery (for transmission and/or monitoring of SL relay discovery messages). (Pre) configuration of SL resource pool or SL resource includes the indication to inform what kind of SL relay UE can be found via an SL relay discovery procedure using this SL resource pool or SL resource.

In addition, separate SL resource pool or SL resource can be also (pre)configured for a model A SL relay discovery procedure and a model B SL relay discovery procedure. In the case, (pre)configuration of SL resource pool or SL resource includes the indication to inform which SL relay discovery procedure needs to be performed using this SL resource pool or SL resource.

Figure 9:
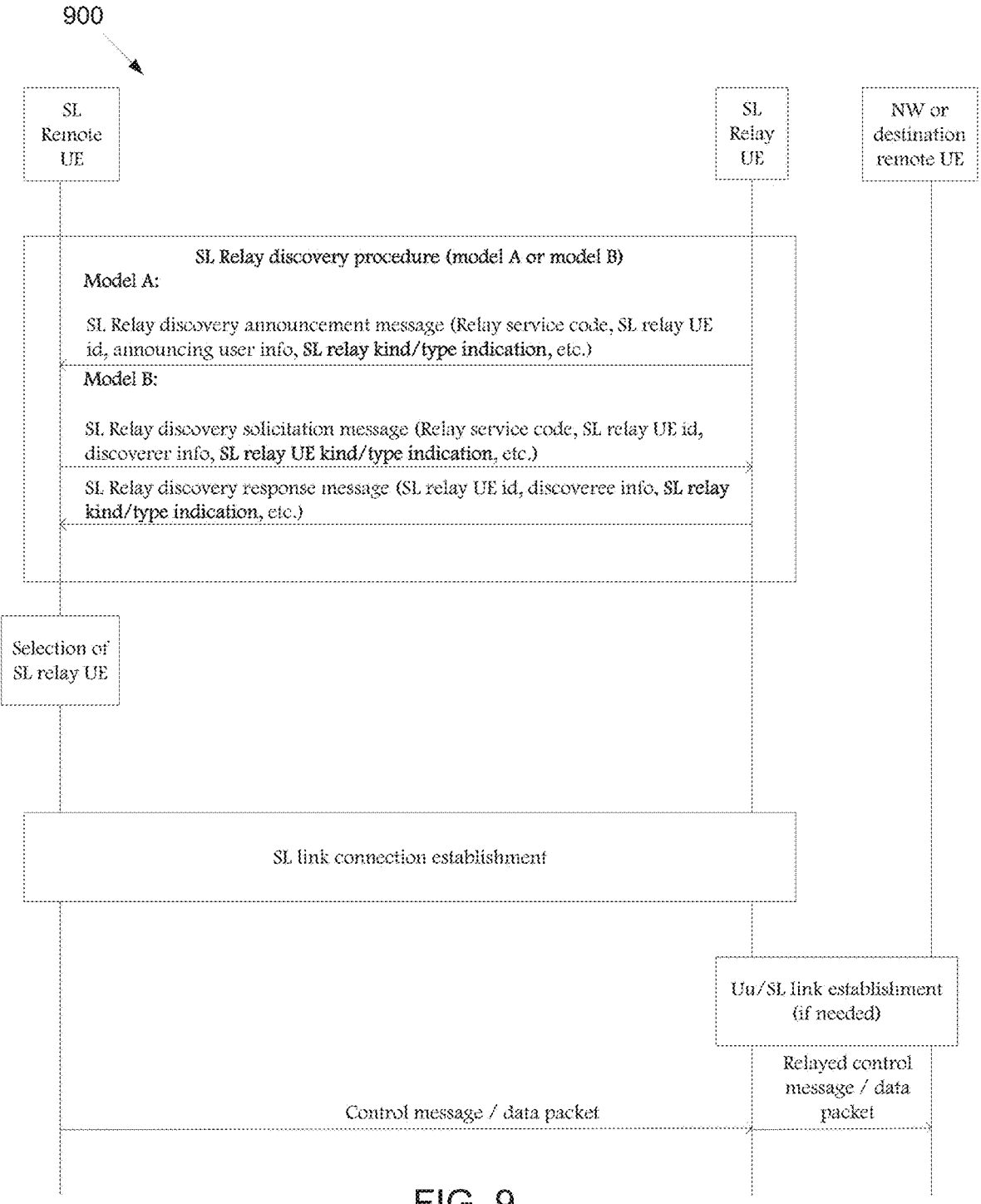
FIG. 9 illustrates an example signaling flow for enhanced SL relay discovery according to embodiments of the present disclosure.

FIG. 9 illustrates an example signaling flow 900 for enhanced SL relay discovery according to embodiments of the present disclosure. The signaling flow 900 as may be performed by UEs (e.g., 111-116 as illustrated in FIG. 1). An embodiment of the signaling flow 900 shown in FIG. 9 is for illustration only. One or more of the components illustrated in FIG. 9 can be implemented in specialized circuitry configured to perform the noted functions or one or more of the components can be implemented by one or more processors executing instructions to perform the noted functions.

As illustrated in FIG. 9, the first SL remote UE needs to find out the SL relay UE in its proximity by an SL relay discovery procedure. The SL relay discovery procedure can be performed by either a model A or a model B. In the model A, the SL relay UE sends an SL relay discovery announcement message periodically so that if the SL remote UE is in SL relay UE proximity, the SL remote UE can be aware of SL relay UE by reception of the SL relay discovery announcement message.

The SL relay discovery announcement message can include RSC, SL relay UE ID and announcing user information.

In one example, RSC may be a parameter identifying a connectivity service the SL relay UE provides. The RSC are (pre)configured in a SL relay UE. Additionally, the RSC also identifies authorized users the SL relay would offer service to and may select the related security policies or information e.g., necessary for authentication and authorization between the SL remote UE and the SL relay UE (e.g., an RSC for relays for police members only may be different than an RSC for relays for fire fighters only, even though potentially they provided connectivity to same APN e.g., to support internet access).

In one example, an SL relay UE ID may be a link layer identifier that is used for direct communication and is associated with an RSC. An SL relay UE has a distinct SL Relay UE ID for each RSC. For support of multiple PDN connections, the SL relay UE can be assigned a different SL Relay UE ID for each PDN Connection.

In one example, announcer Info. provides information about the announcing user.

In one example, an SL relay kind/type indication may be an indication to inform what kind/type of SL relay is supported for the indicated RSC and/or SL relay UE ID. For example, the indication can inform which SL relay is supported out of an L2 UE 2NW relay, an L3 UE 2NW relay, an L2 UE 2UE relay, and an L3 UE 2UE relay (or the indication can inform whether L2 or L3 SL relay is supported and/or whether UE 2NW relay or UE 2UE relay is supported).

In model B, the SL remote UE sends an SL relay discovery solicitation message first and if the corresponding SL relay UE in the SL remote UE's proximity receives this SL relay discovery solicitation message, the SL relay UE sends SL relay discovery response message back to the SL remote UE. The SL relay discovery solicitation message includes a relay service code, an SL relay UE ID and discoverer information.

In one example, RSC may be information about connectivity service that the discoverer UE is interested in. The RSCs are (pre)configured in the SL remote UEs interested in related connectivity services.

In one example, a ProSe relay UE ID may be a link layer identifier of a SL relay UE that is used for direct communication and is associated with an RSC. An SL relay UE has a distinct SL relay UE ID for each RSC. The SL Relay UE ID is optional.

In one example, discoverer Info. provides information about the discoverer user.

In one example, an SL relay kind/type indication may be an indication to inform what kind/type of SL relay is preferred or requested for the indicated RSC and/or SL relay UE ID. For example, the indication can inform which SL relay is requested out of an L2 UE 2NW relay, an L3 UE 2NW relay, an L2 UE 2UE relay, and an L3 UE 2UE relay (or the indication can inform whether L2 or L3 SL relay is preferred/requested and/or whether a UE 2NW relay or a UE 2UE relay is preferred/requested). This information can be optional and if not included in the relay discovery solicitation message, the SL relay kind/type indication is included in the relay discovery response message.

A relay discovery response message includes relay SL relay UE id and discoveree information.

In one example, an SL relay UE ID may be a link layer identifier that is used for direct communication and is associated with an RSC. A SL relay UE has a distinct SL Relay UE ID for each RSC.

In one example, discoveree Info. provides information about the discoveree.

In one example, an SL relay kind/type indication may be an indication to inform what kind/type of SL relay is supported for the indicated RSC and/or SL relay UE ID. For example, the indication can inform which SL relay is supported out of an L2 UE 2NW relay, an L3 UE 2NW relay, an L2 UE 2UE relay, and an L3 UE 2UE relay (or the indication can inform whether an L2 or an L3 SL relay is supported and/or whether a UE 2NW relay or a UE 2UE relay is supported). This information can be optional and if the SL relay kind/type indication was included in the relay discovery solicitation message and the supported SL relay kind/type is same as that in the relay discovery solicitation message, this information can be absent.

It may be noted that an SL relay discovery announcing message and/or an SL relay discovery solicitation/SL relay discovery response message can be a control information message in radio interface protocol (e.g., RRC) or an upper layer control information message (e.g., ProSe sub-layer, V2X layer, etc.). Once the SL remote UE finds out the corresponding SL relay UE by SL relay discovery procedure, the SL remote UE selects the SL relay UE and performs SL link connection establishment with the selected SL relay UE. If needed, the SL relay UE needs to perform Uu or SL link establishment to the gNB or the destination SL remote UE. Then the SL remote UE 's control message and/or data packet which is destined to the network (NW) or the destination SL remote UE can be relayed by the SL relay UE.

Figure 10A:
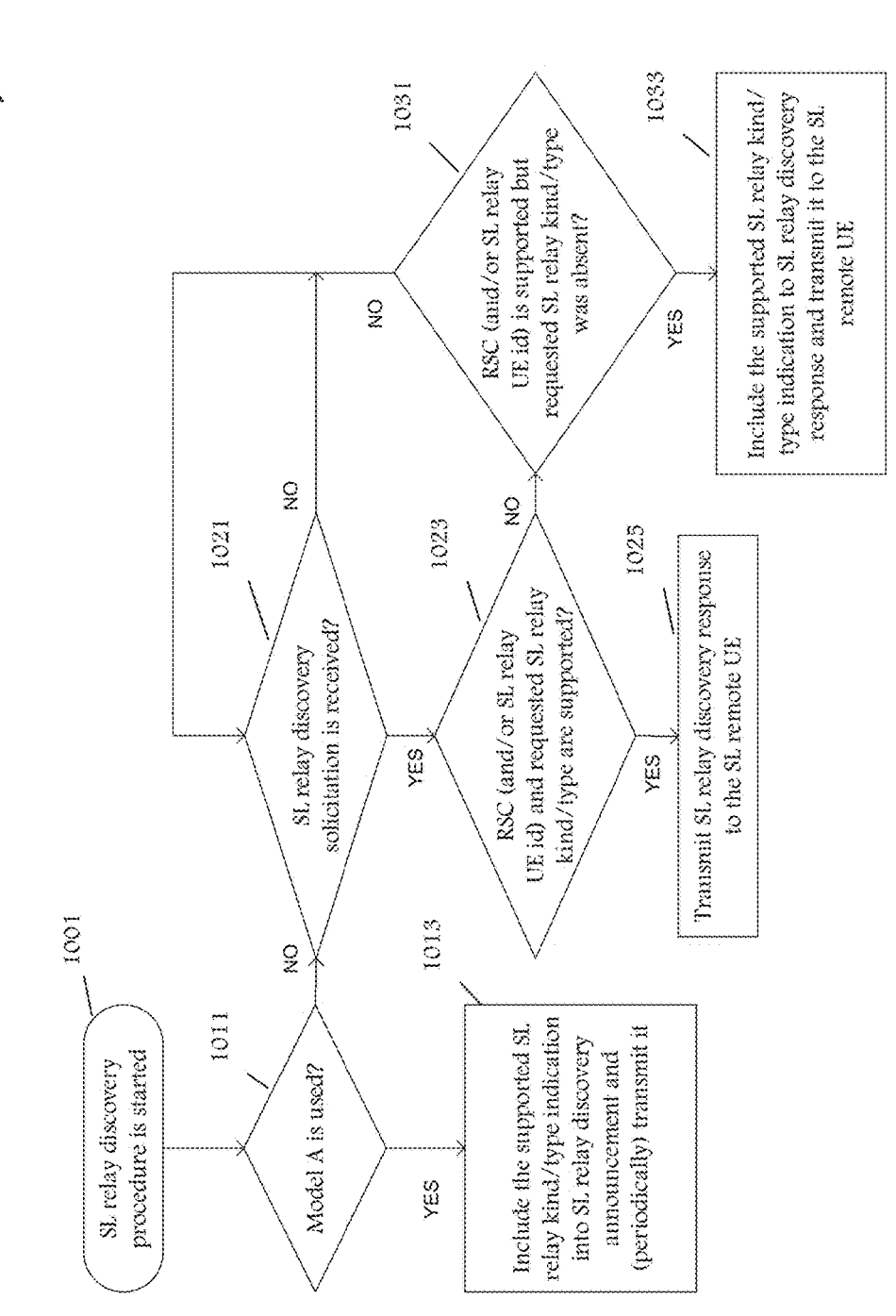
FIG. 10A illustrates a flowchart of a method for SL relay UE procedure according to embodiments of the present disclosure.

FIG. 10A illustrates a flowchart of a method 1000 for SL relay UE procedure according to embodiments of the present disclosure. The method 1000 as may be performed by a UE (e.g., 111-116 as illustrated in FIG. 1). An embodiment of the method 1000 shown in FIG. 10A is for illustration only. One or more of the components illustrated in FIG. 10A can be implemented in specialized circuitry configured to perform the noted functions or one or more of the components can be implemented by one or more processors executing instructions to perform the noted functions.

Figure 10B:
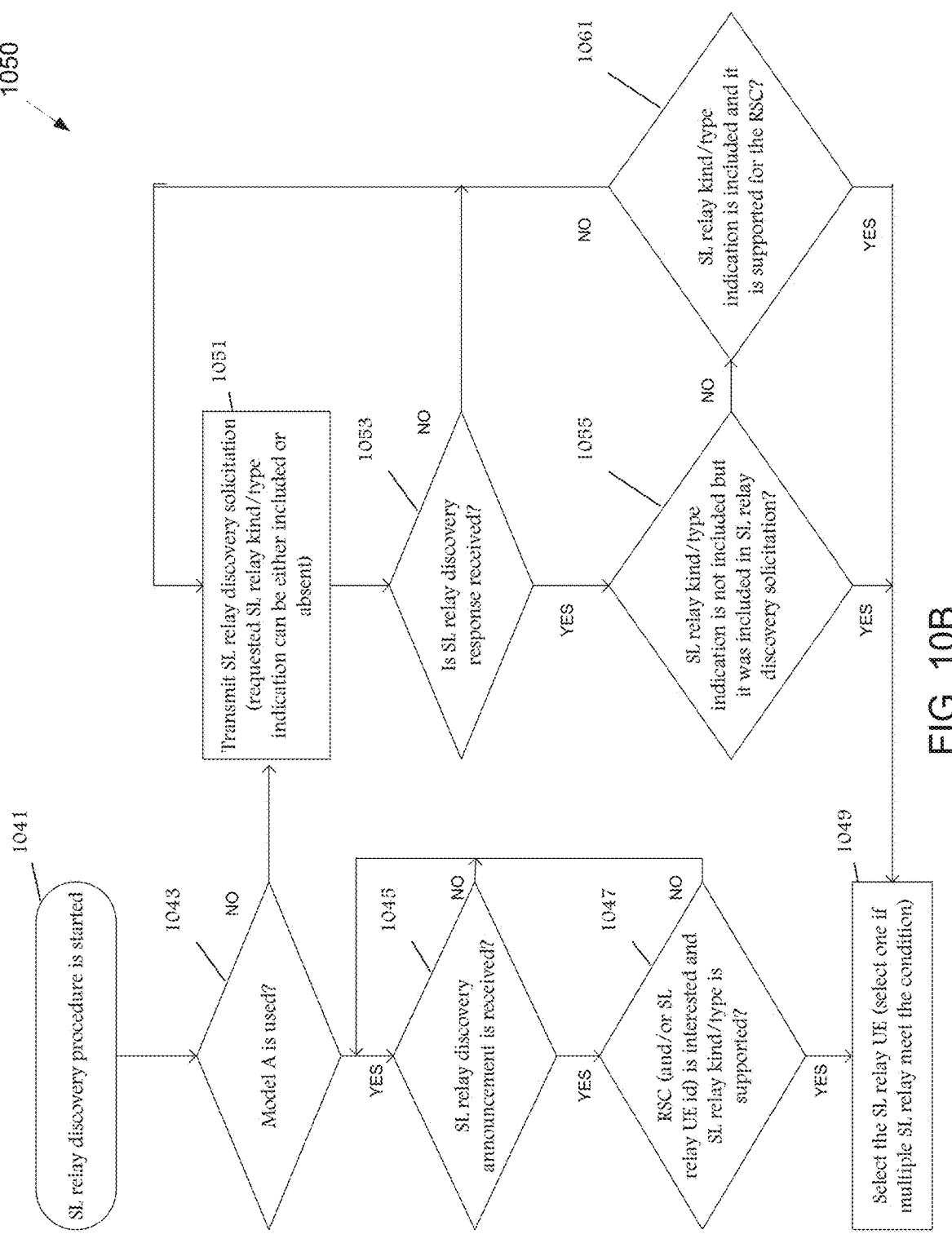
FIG. 10B illustrates a flowchart of a method for SL relay remote UE procedure according to embodiments of the present disclosure.

FIG. 10B illustrates a flowchart of a method 1050 for SL relay remote UE procedure according to embodiments of the present disclosure. The method 1050 as may be performed by a UE (e.g., 111-116 as illustrated in FIG. 1). An embodiment of the method 1050 shown in FIG. 10B is for illustration only. One or more of the components illustrated in FIG. 10B can be implemented in specialized circuitry configured to perform the noted functions or one or more of the components can be implemented by one or more processors executing instructions to perform the noted functions.

FIG. 10A and FIG. 10B illustrate corresponding SL relay UE and SL remote UE procedures according to FIG. 9. FIG. 10A illustrates the corresponding SL relay UE procedures. Once SL relay discovery procedure is started (in step 1001), if model A is used, the SL relay UE includes the supported (or (pre)configured) SL relay kind/type indication corresponding to the indicated RSC (and/or SL relay UE id) into SL relay discovery announcement message and (periodically) transmit the message (step 1011, step 1013).

The supported kind/type of SL relay in the SL relay UE can be pre-determined (e.g., based on UE capability and/or fixed one according to RSC) or (pre)configured when SL relay related parameters (e.g., RSC, SL relay UE id, etc.) are (pre)configured by network. The indication can inform which SL relay is supported out of an L2 UE 2NW relay, an L3 UE 2NW relay, an L2 UE 2UE relay, and an L3 UE 2UE relay (or the indication can inform whether an L2 or an L3 SL relay is supported and/or whether a UE 2NW relay or a UE 2UE relay is supported).

If model B is used and an SL relay discovery solicitation message is received from a certain SL remote UE and if requested RSC (and/or SL relay UE id) and requested SL relay kind/type in the SL relay discovery solicitation are supported (or (pre)configured), the SL relay UE transmit an SL relay discovery response message to the SL remote UE (step 1121, step 1123, step 1125). If mode B is used and an SL relay discovery solicitation message is received from a certain SL remote UE and if requested RSC (and/or SL relay UE id) is/are supported but there was no requested SL relay kind/type indication in SL relay discovery solicitation message, the SL relay UE includes the supported (or (pre) configured) SL relay kind/type indication corresponding to the received RSC (and/or SL relay UE id) into an SL relay discovery response message and transmits the message to the SL remote UE (step 1021, step 1031, step 1033).

If mode B is used and an SL relay discovery solicitation message is received from a certain SL remote UE but requested RSC (and/or SL relay UE ID) is not supported, the SL relay UE does not transmit an SL relay discovery response message and continue to check if there is any other SL relay discovery solicitation message (step 1021, step 1031, step 1021).

FIG. 10B illustrates the corresponding SL remote UE procedures. Once SL relay discovery procedure is started (step 1041), if model A is used and if the SL remote UE receives SL relay discovery announcement, and if the RSC in SL relay discovery announcement is what the SL remote UE is interested for a connectivity service and SL relay kind/type in the SL relay discovery announcement is supported (or (pre)configured) for the RSC (and/or SL relay UE id), the SL remote UE selects the SL relay UE who transmitted an SL relay discovery announcement message (step 1043, step 1045, step 1047, step 1049). If the SL remote UE receives SL relay discovery announcement that meets the above condition from multiple SL relay UEs, the SL remote UE can select one of them.

If model B is used, the SL remote UE transmits an SL relay discovery solicitation message (step 1043, step 1051). The SL remote UE can include the requested (or (pre) configured) SL relay kind/type indication for the RSC into an SL relay discovery solicitation message. The requested kind/type of SL relay in the SL remote UE can be pre-determined (e.g., based on UE capability and/or fixed one according to RSC) or (pre)configured when SL relay related parameters (e.g., RSC, SL relay UE id, etc.) are (pre) configured by network. The indication can inform which SL relay is requested (or (pre)configured) out of an L2 UE 2NW relay, an L3 UE 2NW relay, an L2 an UE 2UE relay, and an L3 UE 2UE relay (or the indication can inform whether L2 or L3 SL relay is requested (or (pre)configured) and/or whether the UE 2NW relay or the UE 2UE relay is requested (or (pre)configured).

It may be noted that this information also can be absent in the SL relay discovery solicitation message. Once SL remote UE transmitted an SL relay discovery solicitation message, if the SL remote UE receives the SL relay discovery response message as a response to the SL relay discovery solicitation and if the SL relay kind/type indication is not included in the SL relay discovery response message but the SL relay kind/type indication was included in the prior SL relay discovery solicitation message sent by the SL remote UE, the SL remote UE selects the SL relay UE who transmitted the SL relay discovery response message (step 1053, step 1055, step 1049).

If the SL remote UE receives SL relay discovery response that meets the above condition from multiple SL relay UEs, the SL remote UE can select one of them. Once the SL remote UE transmitted the SL relay discovery solicitation message, if the SL remote UE receives the SL relay discovery response message as a response to the SL relay discovery solicitation and if the SL relay kind/type indication is included in the SL relay discovery response message and the SL relay kind/type indication is supported (or (pre)configured) for the RSC, the SL remote UE selects the SL relay UE who transmitted the SL relay discovery response message (step 1053, step 1055, step 1061, step 1049).

If the SL remote UE receives the SL relay discovery response that meets the above condition from multiple SL relay UEs, the SL remote UE can select one of them. Once the SL remote UE transmitted the SL relay discovery solicitation message, if the UE does not receive any SL relay discovery response message or if the UE does not receive any SL relay discovery response that includes the SL relay kind/type indication the SL remote UE supports for some time (e.g., a kind of timer to wait until the reception of the appropriate SL relay discovery response message can be also (pre)configured to the SL remote UE and in the case, the timer can be started when SL relay discovery solicitation message is sent and if the timer expires), the SL remote UE may re-transmit the SL relay discovery solicitation message (step 1053 and step 1051, or step 1053, step 1055, step 1061, and step 1051).

Figure 11:
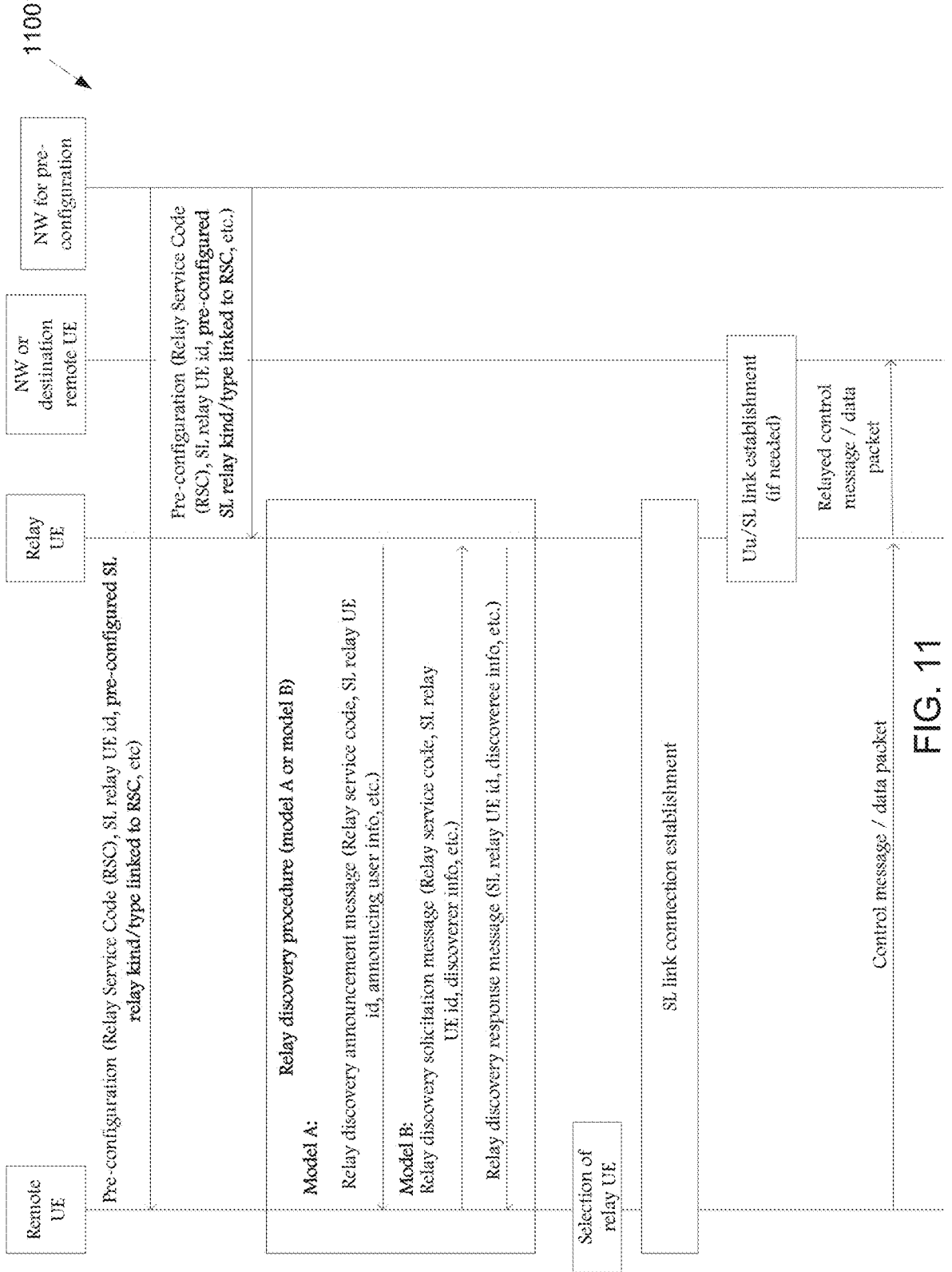
FIG. 11 illustrates an example signaling flow for enhanced SL relay discovery according to embodiments of the present disclosure.

FIG. 11 illustrates an example signaling flow 1100 for enhanced SL relay discovery according to embodiments of the present disclosure. The signaling flow 1100 as may be performed by UEs (e.g., 111-116 as illustrated in FIG. 1). An embodiment of the signaling flow 1100 shown in FIG. 11 is for illustration only. One or more of the components illustrated in FIG. 11 can be implemented in specialized circuitry configured to perform the noted functions or one or more of the components can be implemented by one or more processors executing instructions to perform the noted functions.

FIG. 11 illustrates that one RSC is only linked to the pre-determined (or pre-configured) kind/type of SL relay UE, so that both SL relay UE and SL remote UE can know what kind/type of SL relay is supported (e.g., in SL relay discovery announcement or SL relay discovery response message) or what kind/type of SL relay is requested (e.g., in SL relay discovery solicitation message) according to the received RSC in the corresponding SL relay discovery message.

It may be noted that if RSC is different, the pre-determined (or pre-configured) kind/type of SL relay function may be different. For example, RSC #A is used for connectivity service for firefighters and an SL L2 UE 2UE relay is pre-determined (or pre-configured) for RSC #A and RSC #B is used for different connectivity service for the firefighters then different kind/type of SL relay (e.g., SL L3 UE 2NW relay) can be pre-determined (or pre-configured) for RSC #B.

There can be multiple options how to pre-determine (or pre-configure) the relation between an RSC and a kind/type of SL relay UE. One option can be the UE is mandated to implement the pre-determined kind/type of SL relay functions if the UE is used for either SL relay UE or SL remote UE for an RSC.

In another option, this linkage information is preconfigured also when an SL relay related parameters are pre-configured to the SL remote UE and the SL relay UE. For example, when the SL relay related parameters are pre-configured to the SL remote UE and the SL relay UE, in addition to an RSC (and/or SL relay UE id) the NW can also pre-configure the indication to inform what kind/type of SL relay is linked to the RSC.

The indication can inform what SL relay out of L2 UE 2NW relay, L3 UE 2NW relay, L2 UE 2UE relay and L3 UE 2UE relay is linked to the RSC (or the indication can inform whether L2 or L3 SL relay is linked to the RSC and/or whether UE 2NW relay or UE 2UE relay is linked to the RSC). Since certain pre-configured kind/type of SL relay is only used for an RSC, both SL relay UE and SL remote UE who are interested in the same RSC have same understanding what kind/type of SL relay function is used for the corresponding connectivity service for the RSC.

FIG. 11 illustrates the second option and since all other procedures except pre-configuration are almost same as the descriptions in FIG. 8, that description is omitted in FIG. 11.

Figure 12:
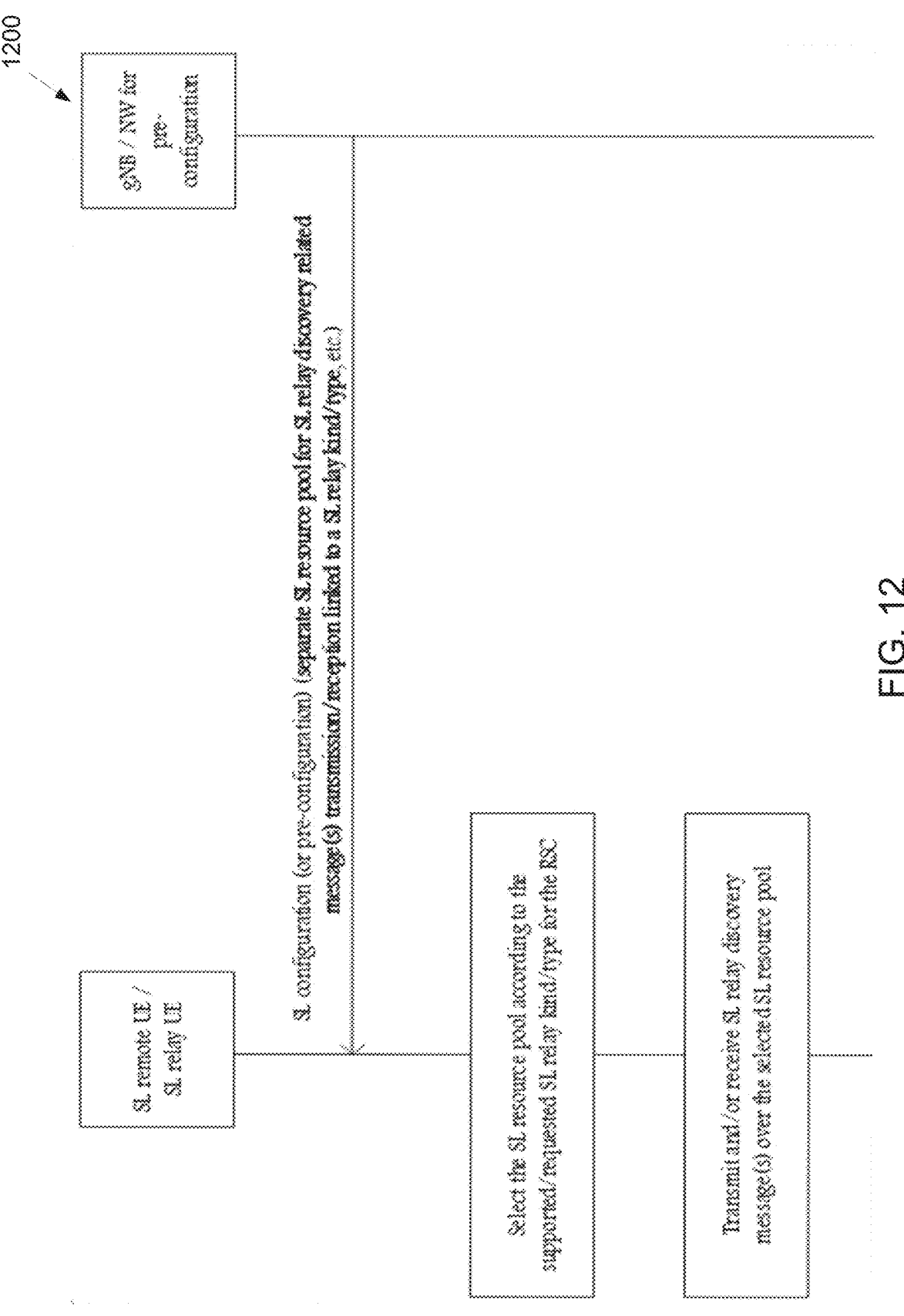
FIG. 12 illustrates another example signaling flow for enhanced SL relay discovery according to embodiments of the present disclosure.

FIG. 12 illustrates another example signaling flow 1200 for enhanced SL relay discovery according to embodiments of the present disclosure. The signaling flow 1200 as may be performed by a UE (e.g., 111-116 as illustrated in FIG. 1) and a base station (e.g., 101-103 as illustrated in FIG. 1). An embodiment of the signaling flow 1200 shown in FIG. 12 is for illustration only. One or more of the components illustrated in FIG. 12 can be implemented in specialized circuitry configured to perform the noted functions or one or more of the components can be implemented by one or more processors executing instructions to perform the noted functions.

FIG. 12 illustrates the third example of embodiments. In this example, a gNB or a network (NW) for an SL relay related pre-configuration configures (or pre-configures) separate SL resource pool, which is used in a SL relay discovery message(s) (e.g., SL relay discovery announcement in model A, and SL relay discovery solicitation and SL relay discovery response in model B) transmission and/or reception, for a different SL relay kind/type. For example, when the gNB configures an SL resource pool that is used in the SL relay discovery message(s) transmission and/or reception, the gNB can also include the associated SL relay kind/type information.

For example, the gNB configures an SL resource pool #A and an SL resource pool #B for the SL relay discovery message(s) transmission and/or reception, and the SL resource pool #A indicates that it is linked to an L3 UE 2NW relay and the SL resource pool #B indicates that it is linked to an L2 UE 2UE relay. The gNB can configure the SL resource pools and additionally its linkage to certain kind/type of SL relay information either by system information or a dedicated RRC message (e.g., RRC connection reconfiguration).

Once the SL remote UE and/or SL relay UE receive the separate SL resource pool configuration, the UE selects the corresponding SL resource pool for transmission and/or reception of SL relay discovery message(s) according to the supported or requested SL relay kind/type for the RSC. For example, for the RSC, the UE is interested, if an L3 UE 2NW relay is supported/requested (or pre-configured) (e.g., L3 UE 2NW relay is supported (or pre-configured) in an SL relay UE side to the RSC, or an L3 UE 2NW relay is requested (or pre-configured) in an SL remote UE side to the RSC), the UE selects the SL resource pool #A for the SL relay discovery message(s) transmission and/or reception. In this case, these UEs do not use the SL resource pool #B in the SL relay discovery. By separation of SL resource pool to different kind/type of SL relay, it makes sure both SL remote UE and SL relay UE use the same SL resource pool in SL relay discovery so that the UEs that use the same SL resource pool have the same understanding what kind of SL relay is announced or requested and responded in SL relay discovery.

For the RSC the UE is interested, if the L2 UE 2UE relay is supported/requested (or pre-configured), corresponding SL relay UE and remote UE may use an SL resource pool #B in the SL relay discovery. The linkage information can inform what the SL relay out of the L2 UE 2NW relay, the L3 UE 2NW relay, the L2 UE 2UE relay, and the L3 UE 2UE relay is linked to the SL resource pool (or the linkage information can inform whether the L2 or the L3 SL relay is linked to the SL resource pool and/or whether the UE 2NW relay or the UE 2UE relay is linked to the SL resource pool). Once the UE selects the corresponding SL resource pool for the SL relay discovery, the UE transmits and/or receives the SL relay discovery message(s) over the selected SL resource pool.

The example of enhanced SL relay discovery illustrated in FIGS. 9, 10A, 10B, 11, and 12 can be also combined. For example, the second example in FIG. 11 can be used in a pre-configuration phase and the first example in FIGS. 8, 10A, and 10B and/or the third example in FIG. 12 can be used in the SL relay discovery phase.

Figure 13:
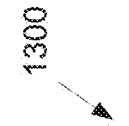
FIG. 13 illustrates an example SL control plane and SL user plane RRC stack.
Figure 13:
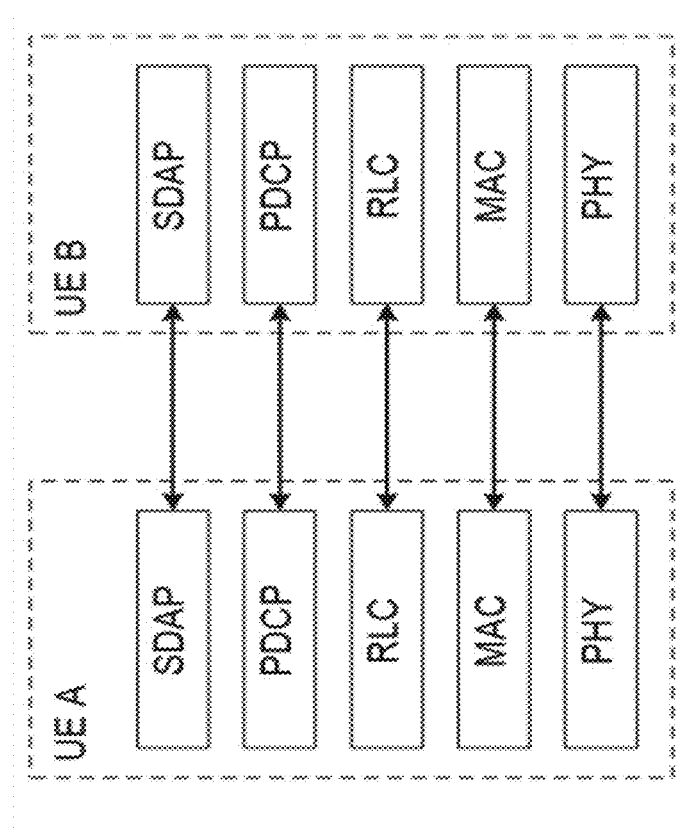
Figure 13:
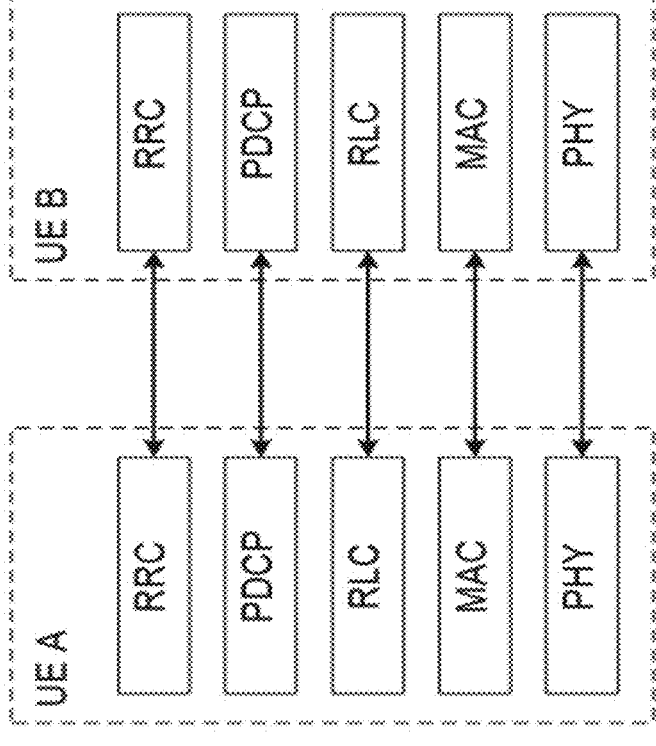

FIG. 13 illustrates an example SL control plane and SL user plane RRC stack 1300. An embodiment of the SL control plane and SL user plane RRC stack 1300 shown in FIG. 13 is for illustration only.

For SL communication, the radio interface L1/L2/L3 (layer 1/layer 2/layer 3) protocols includes PHY protocol as specified in 3GPP standard specification, MAC protocol, RLC protocol, PDCP protocol, RRC protocol, and SDAP protocol. FIG. 13 illustrates the example of SL control plane radio protocol stack (for SL-RRC) and SL user plane data radio protocol stack for NR SL communication.

A physical protocol layer handles physical layer signals/channels and physical layer procedures (e.g., physical layer channel structure, physical layer signal encoding/decoding, SL power control procedure, SL CSI (Channel Status Information) related procedure). Main physical SL channels and signals are defined as shown: (1) Physical sidelink control channel (PSCCH) indicates resource and other transmission parameters used by a UE for PSSCH; (2) Physical sidelink shared channel (PSSCH) transmits the TBs of data themselves and CSI feedback information, etc.; (3) Physical sidelink feedback channel (PSFCH) transmits HARQ feedback over the sidelink from a UE which is an intended recipient of a PSSCH transmission to the UE which performed the transmission; (4) Sidelink synchronization signal includes sidelink primary and sidelink secondary synchronization signals (S-PSS, S-SSS); and (5) Physical sidelink broadcast channel (PSBCH) indicates the required essential system information for SL operations.

A MAC protocol layer performs packet filtering (e.g., determine whether the received packet is actually destined to the UE) based on the L2 source and destination ids in the MAC header), SL carrier/resource pool/resource within the resource pool (re)selection, priority handling between SL and UL (Uplink) for a given UE, SL logical channel prioritization, the corresponding packet multiplexing (e.g., multiplexing multiple MAC SDUs into a given MAC PDU), and SL HARQ retransmissions/receptions.

An RLC protocol layer performs RLC SDU segmentation/SDU reassembly, re-segmentation of RLC SDU segments, and error correction through ARQ (only for AM data transfer). PDCP protocol layer performs header compression/decompression, ciphering and/or integrity protection, duplication detection, re-ordering and in-order packet delivery to the upper layer and out-of-order packet delivery to the upper layer. RRC protocol layer performs transfer of a SL-RRC message, which is also named as PC5-RRC, between peer UEs, maintenance and release of SL-RRC connection between two UEs, and detection of SL radio link failure for a SL-RRC connection.

An SDAP protocol layer performs mapping between a quality of service (QoS) flow and an SL data radio bearer. It may be noted that the term of SL-RRC or PC5-RRC is used in the present disclosure.

In the TX UE side, MAC performs SL logical channel prioritization when multiplexing and assembling multiple SL logical channels into a MAC PDU.

TABLE 1 shows the multiplexing and assembly as described in 3GPP standard specification.

TABLE 1

| Multiplexing and assembly |
| --- |
| 5.22.1.4 Multiplexing and assembly |
| For PDU(s) associated with one SCI, MAC shall consider only logical channels with the same Source Layer-2 ID-Destination Layer-2 ID pair for one of unicast, groupcast and broadcast which is associated with the pair. Multiple transmissions for different Sidelink processes are allowed to be independently performed in different PSSCH durations. |
| 5.22.1.4.1 Logical channel prioritization |
| 5.22.1.4.1.1 General |
| The sidelink Logical Channel Prioritization procedure is applied whenever a new transmission is performed. |
| RRC controls the scheduling of sidelink data by signalling for each logical channel: |
| sl-Priority where an increasing priority value indicates a lower priority level; |
| sl-PrioritisedBitRate which sets the sidelink Prioritized Bit Rate (sPBR); |
| sl-BucketSizeDuration which sets the sidelink Bucket Size Duration (sBSD). |
| RRC additionally controls the LCP procedure by configuring mapping restrictions for each logical channel: |
| sl-configuredGrantType1Allowed which sets whether a configured grant Type 1 can be used for sidelink transmission; |
| sl-AllowedCG-List which sets the allowed configured grant(s) for sidelink transmission; |
| sl-HARQ-FeedbackEnabled which sets whether the logical channel is allowed to be multiplexed with logical channel(s) with sl-HARQ-FeedbackEnabled set to enabled or disabled. |
| The following UE variable is used for the Logical channel prioritization procedure: |
| SBj which is maintained for each logical channel j. |
| The MAC entity shall initialize SBj of the logical channel to zero when the logical channel is established. |
| For each logical channel j, the MAC entity shall: |
| 1> increment SBj by the product sPBR × T before every instance of the LCP procedure, where T is the time elapsed since SBj was last incremented; |
| 1> if the value of SBj is greater than the sidelink bucket size (i.e., sPBR × sBSD): |
| 2> set SBj to the sidelink bucket size. |

TABLE 1-continued

Multiplexing and assembly

NOTE: The exact moment(s) when the UE updates SBj between LCP procedures is up to UE implementation, as long as SBj is up to date at the time when a grant is processed by LCP.

TABLE 2 shows the selection of logical channels as described in 3GPP standard specification.

TABLE 2

Selection of logical channels 5.22.1.4.1.2 Selection of logical channels
The MAC entity shall for each SCI corresponding to a new transmission:
1> select a Destination associated to one of unicast, groupcast and broadcast, having
at least one of the MAC CE and the logical channel with the highest priority, among the
logical channels that satisfy all the following conditions and MAC CE(s), if any, for the SL
grant associated to the SCI:
2> SL data is available for transmission; and
2> SBj > 0, in case there is any logical channel having SBj > 0; and
2> sl-configuredGrantType1Allowed, if configured, is set to true in case the SL grant
is a Configured Grant Type 1; and
2> sl-AllowedCG-List, if configured, includes the configured grant index associated
to the SL grant; and
2> sl-HARQ-FeedbackEnabled is set to disabled, if PSFCH is not configured for the
SL grant associated to the SCI.
NOTE: If multiple Destinations have the logical channels satisfying all conditions above
with the same highest priority or if multiple Destinations have either the MAC CE and/or
the logical channels satisfying all conditions above with the same priority as the MAC CE,
which Destination is selected among them is up to UE implementation.
1> select the logical channels satisfying all the following conditions among the
logical channels belonging to the selected Destination:
2> SL data is available for transmission; and
2> sl-configuredGrantType1Allowed, if configured, is set to true in case the SL grant
is a Configured Grant Type 1; and.
2> sl-AllowedCG-List, if configured, includes the configured grant index associated
to the SL grant; and
3> if PSFCH is configured for the sidelink grant associated to the SCI:
4> sl-HARQ-FeedbackEnabled is set to enabled, if sl-HARQ-FeedbackEnabled is
set to enabled for the highest priority logical channel satisfying the above conditions; or
4> sl-HARQ-FeedbackEnabled is set to disabled, if sl-HARQ-FeedbackEnabled is
set to disabled for the highest priority logical channel satisfying the above conditions.
3> else:
4> sl-HARQ-FeedbackEnabled is set to disabled.

TABLE 3 shows the allocation of sidelink resources as described in 3GPP standard specification.

TABLE 3

Allocation of sidelink resources 5.22.1.4.1.3 Allocation of sidelink resources
The MAC entity shall for each SCI corresponding to a new transmission:
1> allocate resources to the logical channels as follows:
2> logical channels selected in clause 5.22.1.4.1.2 for the SL grant with SBj > 0 are
allocated resources in a decreasing priority order. If the sPBR of a logical channel is set to
infinity, the MAC entity shall allocate resources for all the data that is available for
transmission on the logical channel before meeting the sPBR of the lower priority logical
channel(s);
2> decrement SBj by the total size of MAC SDUs served to logical channel j above;
2> if any resources remain, all the logical channels selected in clause 5.22.1.4.1.2
are served in a strict decreasing priority order (regardless of the value of SBj) until either the
data for that logical channel or the SL grant is exhausted, whichever comes first. Logical
channels configured with equal priority should be served equally.
NOTE: The value of SBj can be negative.
The UE shall also follow the rules below during the SL scheduling procedures above:
the UE should not segment an RLC SDU (or partially transmitted SDU or
retransmitted RLC PDU) if the whole SDU (or partially transmitted SDU or retransmitted
RLC PDU) fits into the remaining resources of the associated MAC entity;
if the UE segments an RLC SDU from the logical channel, it shall maximize the
size of the segment to fill the grant of the associated MAC entity as much as possible;
the UE should maximise the transmission of data;
if the MAC entity is given a sidelink grant size that is equal to or larger than 12

TABLE 3-continued

Allocation of sidelink resources bytes while having data available and allowed (according to clause 5.22.1.4.1) for
transmission, the MAC entity shall not transmit only padding;
A logical channel configured with sl-HARQ-FeedbackEnabled set to enabled
and a logical channel configured with sl-HARQ-FeedbackEnabled set to disabled cannot be
multiplexed into the same MAC PDU.
The MAC entity shall not generate a MAC PDU for the HARQ entity if the following
conditions are satisfied:
there is no Sidelink CSI Reporting MAC CE generated for this PSSCH
transmission as specified in clause 5.22.1.7; and
the MAC PDU includes zero MAC SDUs.
Logical channels shall be prioritised in accordance with the following order (highest priority
listed first):
data from SCCH;
Sidelink CSI Reporting MAC CE;
data from any STCH.

TABLE 4 shows the multiplexing of MAC control elements and MAC SDUs as described in 3GPP standard specification.

TABLE 4

Multiplexing of MAC control elements and MAC SDUs 5.22.1.4.2 Multiplexing of MAC Control Elements and MAC SDUs
The MAC entity shall multiplex a MAC CE and MAC SDUs in a MAC PDU according to
clauses 5.22.1.4.1 and 6.1.6.

In 3GPP Rel-16, the basic SL communication functionalities are supported and specified. For Rel-17, it is planned to introduce more enhanced features into SL and one of them is to introduce SL DRX (Discontinuous Reception) operation. In an SL DRX operation, the RX UE monitors SL control channel (PSCCH) and SL data channel (PSSCH) only in the predetermined active time. If the TX UE performs logical channel prioritization as the specified in 3GPP standard specification when the transmission resource is selected/granted and generates MAC PDU accordingly, the RX UE, which is included as the receiver/destination UE of the packet in the MAC PDU, may not successfully receive the packet because the receiver/destination UE may not be in the active time when the SL control and data is transmitted. Thus, enhancement of the current SL logical channel prioritization is required to work well in SL DRX.

Figure 14:
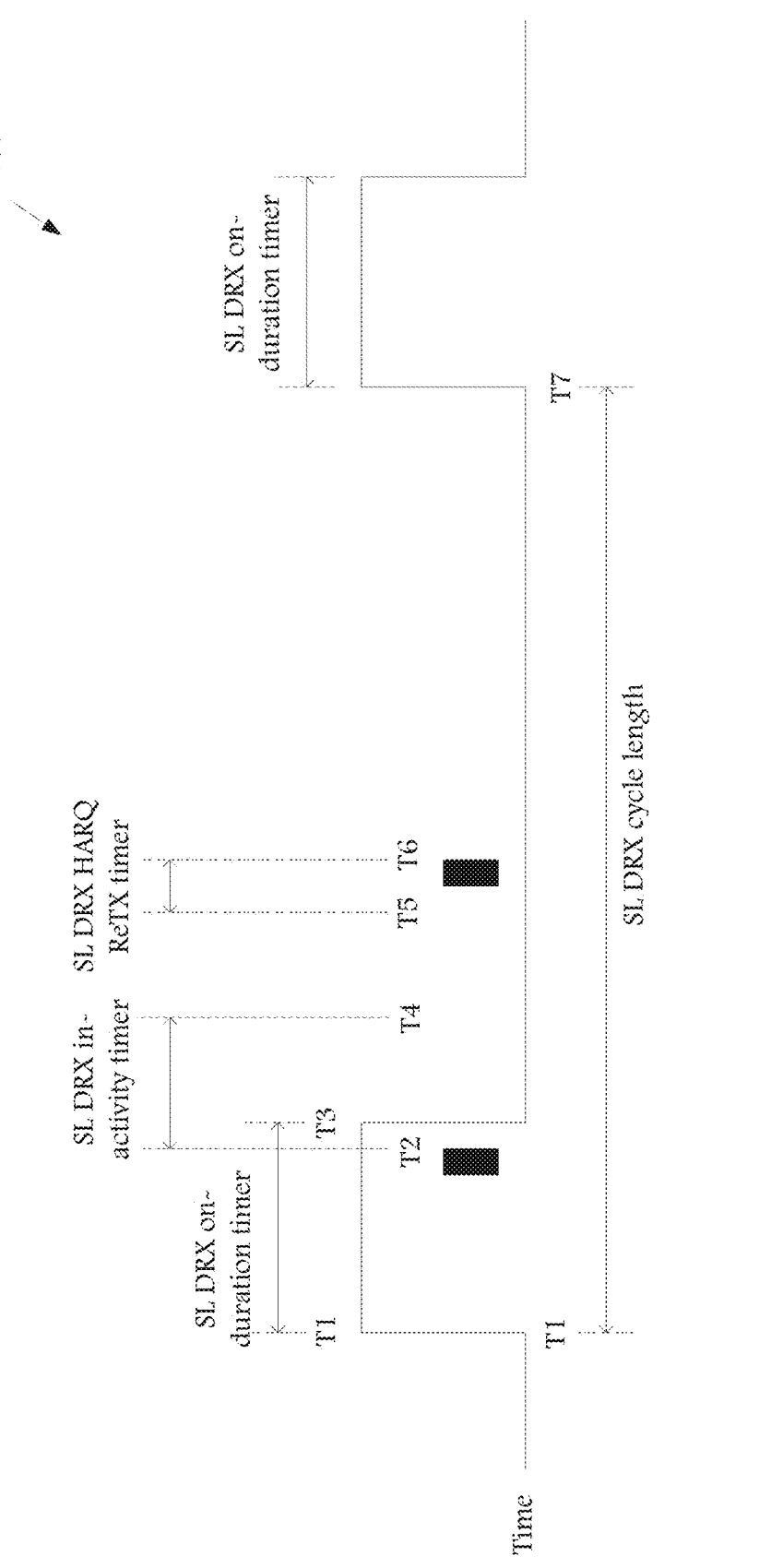
FIG. 14 illustrates an example SL DRX operation according to embodiments of the present disclosure.

FIG. 14 illustrates an example SL DRX operation 1400 according to embodiments of the present disclosure. An embodiment of the SL DRX operation 1400 shown in FIG. 14 is for illustration only.

FIG. 14 describes one example of simple SL DRX operation. It may be noted that an SL DRX operation is an RX UE side behavior for discontinuous control/data reception. Once the SL DRX is configured and activated, the RX UE determines the time T1 where the first SL DRX on-duration timer is started. This determination is derived from the predetermined equation based on the network (pre)configuration parameters. For a DL DRX operation, the equation and the corresponding network configurations are specified in 3GPP standard specification, and for the SL DRX operation, the equation and the corresponding network (pre)configurations may become similar but it does not exclude different ones in the present disclosure.

Once the RX UE determines the system frame number (SFN), a sub-frame number within the SFN and a slot number within the sub-frame that correspond to T1, the RX UE starts SL DRX on-duration timer at T1. This timer value can be (pre)configured by a gNB or other networks. The RX UE monitors PSCCH and PSSCH to receive SL control/data that is scheduled to this RX UE while the SL DRX on-duration timer runs, which means the RX UE at least monitors PSCCH and PSSCH from T1 and T3 (assuming SL DRX on-duration timer expires at T3).

If the RX UE receives the SL control information (SCI) for the initial SL data packet via PSCCH and PSSCH that is scheduled to this RX UE at T2, the RX UE starts SL DRX in-activity timer at {T2+N}, where N is equal or larger than 0. As illustrated in FIG. 14, N is assumed as 0 just for simplicity. The RX UE monitors PSCCH and PSSCH to receive SL control/data that is scheduled to this RX UE while the SL DRX in-activity timer runs, which means the RX UE needs to monitor PSCCH and PSSCH from T2 to T4 (assuming SL DRX in-activity timer expires at T4).

It may be noted that whenever the RX UE receives the SL control information (SCI) for the initial SL data packet via PSCCH and PSSCH that is scheduled to this RX UE, the RX UE restarts the SL DRX in-activity timer if the SL DRX in-activity timer already runs.

If the RX UE does not successfully receive the initial data packet at T2, the corresponding HARQ retransmission(s) comes later, so the RX UE starts SL DRX HARQ retransmission (ReTX) timer at T5. The time distance between T2 and T5 can be either (pre)configured by the gNB or other network or indicated by the received SL control information at T2.

The RX UE monitors PSCCH and PSSCH to receive SL control/data that is scheduled to this RX UE for the HARQ retransmission while the SL DRX HARQ ReTX timer runs. The RX UE skips monitoring of PSCCH and PSSCH if none of {SL DRX on-duration timer, SL DRX in-activity timer, and SL DRX HARQ ReTX timer} runs in SL DRX cycle.

Figure 15:
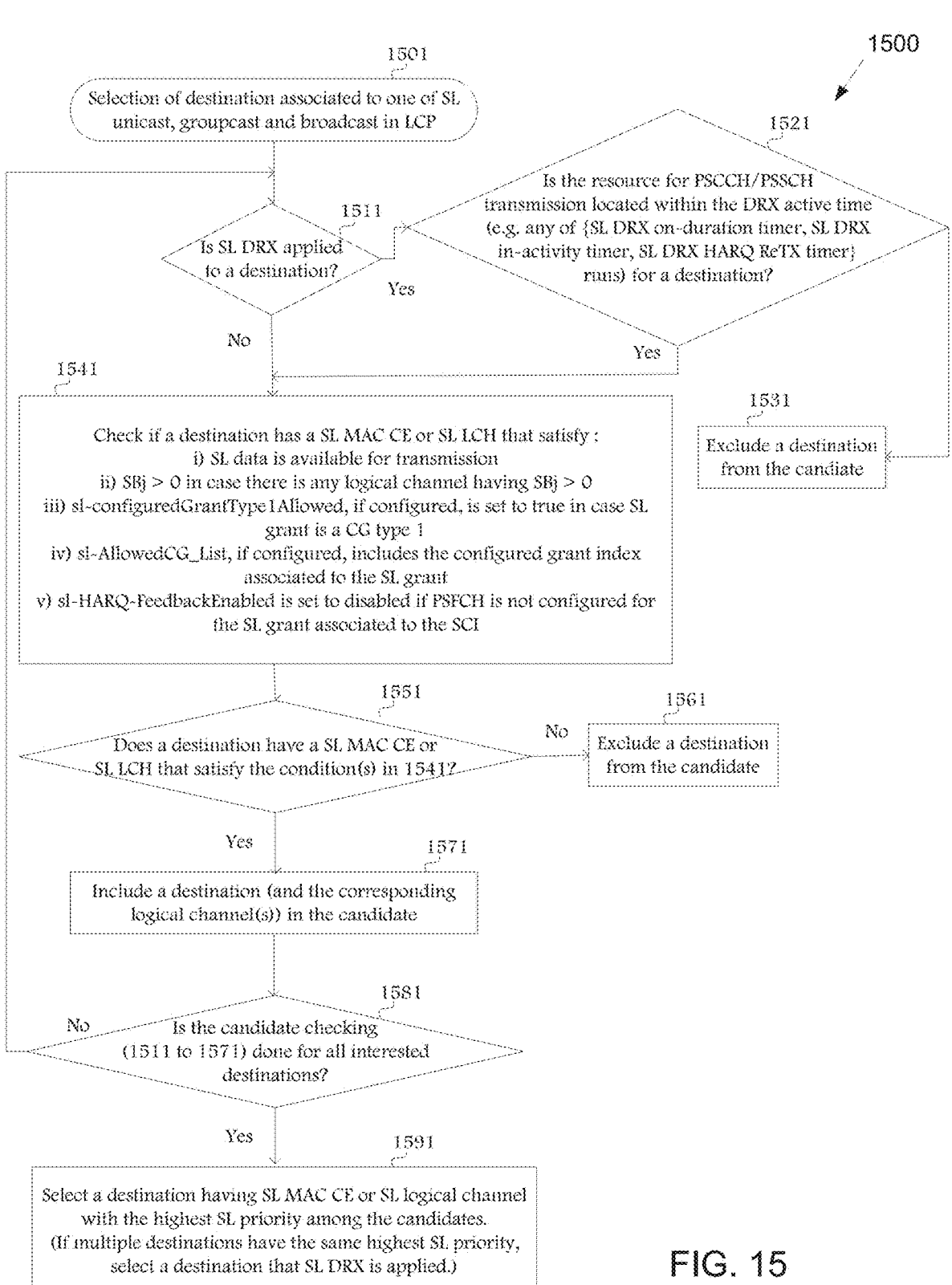
FIG. 15 illustrates a flowchart of a method for destination selection in SL LCP according to embodiments of the present disclosure.

FIG. 15 illustrates a flowchart of a method 1500 for destination selection in SL LCP according to embodiments of the present disclosure. The method 1500 as may be performed by a UE (e.g., 111-116 as illustrated in FIG. 1). An embodiment of the method 1500 shown in FIG. 15 is for illustration only. One or more of the components illustrated in FIG. 15 can be implemented in specialized circuitry configured to perform the noted functions or one or more of the components can be implemented by one or more processors executing instructions to perform the noted functions.

FIG. 15 illustrates an example of the embodiments to enhance SL logical channel prioritization. As illustrated in FIG. 15, an LCP is a logical channel prioritization in the present disclosure. It may be noted that the described SL logical channel prioritization in FIG. 15 is TX UE 's behavior. For each SCI corresponding to a new transmission, the TX UE first selects a destination associated to one of SL unicast, groupcast and broadcast in LCP procedure (1501).

The TX UE checks if an SL DRX is configured and activated for a destination (1511). If the SL DRX is configured and activated for a destination, the TX UE checks if the resource for PSCCH/PSSCH transmission is located within the peer RX UE 's (or destination UE 's) DRX active time in time-domain, for example if any of {SL DRX on-duration timer, SL DRX in-activity timer, SL DRX HARQ ReTX timer} runs for the peer RX UE side (721). Note the TX UE may maintain separate SL DRX transmission active timer(s), which correspond(s) to SL DRX active time in the peer RX UE side.

The SL DRX transmission active timer(s) in the TX UE side can indicate whether the TX UE can schedule or transmit PSCCH/PSSCH or not at a given time. For example, while the timer(s) runs, the TX UE can schedule or transmit PSCCH/PSSCH to the associated peer RX UE. If the time does not run, the TX UE cannot schedule or transmit PSCCH/PSSCH to the associated peer RX UE. In this case, the TX UE checks if the resource for PSCCH/PSSCH transmission is located in a time-domain where the SL DRX transmission active timer(s) for the peer UE(s) (or destination UE(s)) runs in 1521.

If the resource for PSCCH/PSSCH transmission is not located within the peer RX UE 's (or destination UE 's) DRX active time in a time-domain, the TX UE excludes the destination from the candidate (1531). If the SL DRX is not configured and/or not activated for a destination in 1511 or the resource for PSCCH/PSSCH transmission is located with the peer RX UE 's (or destination UE 's) DRX active time in the time-domain, the TX UE checks if the destination has a SL MAC CE or SL logical channel (LCH) that satisfy the following conditions (1541). TABLE 4

TABLE 5 shows the condition for the SL MAC CE or SL LCH checking described from 1511 to 1571 for all interested destinations, the TX UE performs the candidate checking for the next destination (1581, 1511 to 1571). If the TX UE is the candidate checking described from 1511 to 1571 for all interested destinations, the TX UE selects a destination having the SL MAC CE or the SL logical channel with the highest SL priority among the candidates (1581, 1591). If multiple destinations have the same highest SL priority, the TX UE selects a destination that SL DRX is applied in 1511. If multiple destinations have the same highest SL priority and apply SL DRX, how to select one of them is up to TX UE implementation.

As illustrated in FIG. 15, the TX UE performs destination selection equally for the destination(s) that the SL DRX is not applied and the destination(s) that the SL DRX is applied and the resource for PSCCH/PSSCH transmission is located within the SL DRX active time in the peer UE(s) (or destination UE(s)) side.

Another alternative is that the TX UE first performs destination selection only for the candidates including the destinations that the SL DRX is applied. For example, the destinations that are included in the candidate with the steps {1511 (Yes)→1521 (Yes)→1541→1551 (Yes)→1571}. It may be assumed that the destination is the first candidate destinations. The TX UE performs 1591 only among the first candidate destinations that the SL DRX is applied. If there is no first candidate destination that the SL DRX is applied, then the TX UE considers destinations that the SL DRX is not applied in destination selection.

For example, the destination that are included in the candidate with the steps {1511 (No)→1541→1551 (Yes)→1571}. It may be assumed that the destination is the second candidate destinations. The TX UE performs 1591 only among the second candidate destinations that the SL DRX is not applied. In this alternative, 1591 includes only "select a destination having the SL MAC CE or the SL logical channel with the highest SL priority among the candidates." For example, "if multiple destinations have the same highest SL priority, select a destination that the SL DRX is applied in 1591" is not applied to this alternative.

Although it is not described in FIG. 15, once the TX UE selects a destination, the TX UE selects the logical channel (s) among multiple ones belonging to the selected destination and allocates the resources to the selected logical channel(s) as described in the above.

Figure 16:
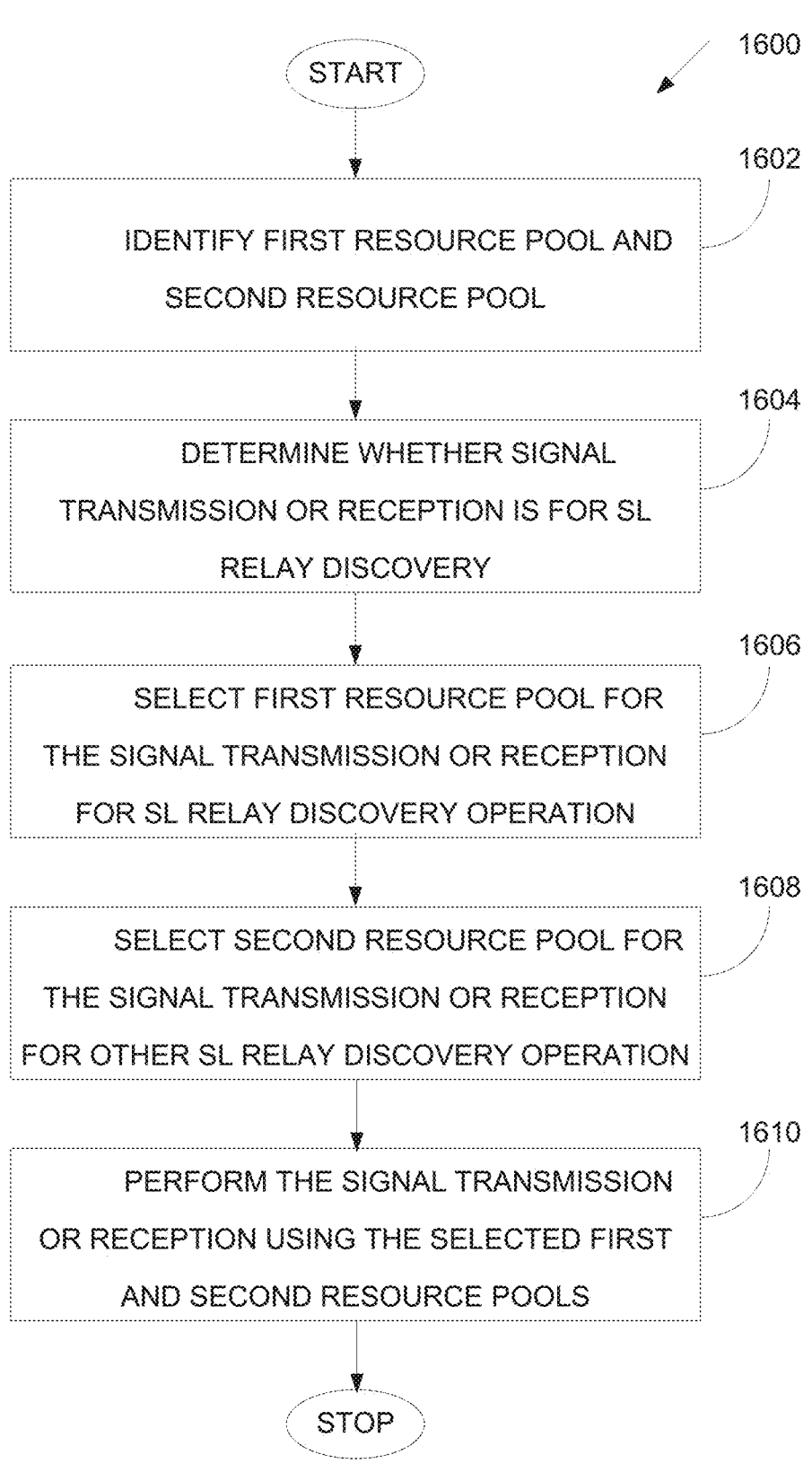
FIG. 16 illustrates a flow chart of a method for SL relay discovery operation according to embodiments of the present disclosure.

FIG. 16 illustrates a flow chart of a method 1600 for SL relay discovery operation according to embodiments of the

TABLE 5

| The condition for the SL MAC CE or SL LCH |
| --- |
| 2> SL data is available for transmission; and |
| 2> SBj > 0, in case there is any logical channel having SBj > 0; and |
| 2> sl-configuredGrantType1Allowed, if configured, is set to true in case the SL grant is a Configured Grant Type 1; and |
| 2> sl-AllowedCG-List, if configured, includes the configured grant index associated to the SL grant; and |
| 2> sl-HARQ-FeedbackEnabled is set to disabled, if PSFCH is not configured for the SL grant associated to the SCI. |

If the destination has an SL MAC CE or an SL LCH that satisfies the conditions in 1541, the TX UE includes the destination (and the corresponding logical channel(s)) in the candidate (1551, 1571). If the destination has none of {SL MAC CE, SL LCH that satisfies the conditions in 1541}, the TX UE excludes the destination from the candidate (1551, 1561). If the TX UE does not complete the candidate present disclosure. The method 1600 as may be performed by a UE (e.g., 111-116 as illustrated in FIG. 1). An embodiment of the method 1600 shown in FIG. 16 is for illustration only. One or more of the components illustrated in FIG. 16 can be implemented in specialized circuitry configured to perform the noted functions or one or more of the components can be implemented by one or more processors executing instructions to perform the noted functions.

As illustrated in FIG. 16, the method 1600 begins at step 1602. In step 1602, a UE identifies a first resource pool for a SL relay discovery operation and a second resource pool for other SL transmission and reception operations.

Subsequently, in step 1604, the UE determines whether a signal transmission or reception is for the SL relay discovery operation or for the other SL transmission and reception operations.

Subsequently, in step 1606, the UE selects the first resource pool for the signal transmission or reception based on a determination that the signal transmission or reception is for the SL relay discovery operation.

Next, in step 1608, the UE selects the second resource pool for the signal transmission or reception based on a determination that the signal transmission or reception is for the other SL transmission and reception operations.

Finally, in step 1608, the UE performs the signal transmission or reception using the selected one of the first and second resource pools.

In one embodiment, the UE selects, based on a type of SL relay operation that the UE is interested in or supports, a third or fourth resource pool, wherein the first resource pool further comprises the third and fourth resource pool.

In one embodiment, the UE receives configuration information to identify a type of the SL relay operation to be discovered or supported; or identifies, based on pre-configuration information, the type of the SL relay operation to be discovered. In such embodiment, the configuration information or the pre-configuration information includes at least one of an RSC, an SL relay UE ID, or a type of SL relay linked to the RSC.

In one embodiment, the UE transmits, to a relay UE, a SL relay discovery solicitation message including at least one of an RSC, an SL relay UE ID, discoverer information, or an indication of a type of SL relay, and determine, based on the SL relay discovery solicitation message, at least one of: whether the signal transmission or reception is for the SL relay discovery operation, or a type of the SL relay operation that the UE is interested in.

In one embodiment, the UE transmits, to a remote UE, a SL relay discovery announcement message including at least one of an RSC, an SL relay UE ID, an indication of available type of SL relay, or announcing user information, and determine, based on the SL relay discovery announcement message, at least one of: whether the signal transmission or reception is for the SL relay discovery operation; or a type of the SL relay operation that the UE supports.

In one embodiment, the UE transmits, to a remote UE, a SL relay discovery response message including at least one of an RSC, an SL relay UE ID, or an indication of available type of SL relay, and determine, based on the SL relay discovery response message, at least one of: whether the signal transmission or reception is for the SL relay discovery operation; or a type of the SL relay operation that the UE supports.

In one embodiment, the UE receives, from a remote UE, a SL relay discovery solicitation message including at least one of an RSC, an SL relay UE ID, or an indication of available type of SL relay, and determine, based on the SL relay discovery solicitation message, at least one of: whether the signal transmission or reception is for the SL relay discovery operation; or a type of the SL relay operation that the UE supports.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) in a wireless communication system, the UE comprising:

a processor configured to:

identify a first resource pool for a sidelink (SL) relay discovery operation and a second resource pool for other SL transmission and reception operations, wherein the first resource pool comprises third and fourth resource pools;

determine whether a signal transmission or reception is for the SL relay discovery operation or for the other SL transmission and reception operations;

select the first resource pool for the signal transmission or reception based on a determination that the signal transmission or reception is for the SL relay discovery operation;

select the second resource pool for the signal transmission or reception based on a determination that the signal transmission or reception is for the other SL transmission and reception operations;

receive a SL relay discovery solicitation message from a remote UE;

identify, based on the SL relay discovery solicitation message received by the UE, (i) a requested relay service code (RSC) or SL relay UE identifier (ID) of the remote UE and (ii) whether an indication of a type of a SL relay operation that the remote UE is interested in is present in the SL relay discovery solicitation message;

determine, based on no indication of the type of the SL relay operation that the remote UE is interested in being present in the SL relay discovery solicitation message, the type of the SL relay operation for the remote UE corresponding the requested RSC or SL relay UE ID of the remote UE that is supported by the UE;

select, based on the determined type of a SL relay operation for the remote UE, the third or fourth resource pool, wherein the type of the SL relay operation is a layer 2 UE to network (L2 UE2NW) relay or a layer 2 UE to UE (L2 UE2UE) relay; and a transceiver operably coupled to the processor, the transceiver configured to perform the signal transmission or reception using the selected one of the first and second resource pools.

2. The UE of claim 1, wherein:

the transceiver is further configured to receive configuration information to identify the type of the SL relay operation that the remote UE is interested in; or the processor is further configured to identify, based on pre-configuration information, the type of the SL relay operation that the remote UE is interested in, and the configuration information or the pre-configuration information indicates a type of SL relay linked to the RSC.

3. The UE of claim 1, wherein the transceiver is further configured to transmit, to the remote UE, a SL relay discovery response message including an indication of the determined type of the SL relay operation for the remote UE corresponding the requested RSC or SL relay UE ID of the remote UE that is supported by the UE.

4. The UE of claim 1, wherein:

the transceiver is further configured to transmit, to the remote UE, a SL relay discovery announcement message including at least one of a RSC, an SL relay UE ID, an indication of an available type of SL relay, and announcing user information; and the SL relay discovery announcement message from the UE indicates a type of SL relay operation that the UE supports.

5. The UE of claim 1, wherein:

the transceiver is further configured to transmit, to the remote UE, a SL relay discovery response message including at least one of a RSC, an SL relay UE ID, and an indication of an available type of SL relay; and the SL relay discovery response message indicates a type of SL relay operation that the UE supports.

6. A method of a user equipment (UE) in a wireless communication system, the method comprising:

identifying a first resource pool for a sidelink (SL) relay discovery operation and a second resource pool for other SL transmission and reception operations, wherein the first resource pool comprises third and fourth resource pools;

determining whether a signal transmission or reception is for the SL relay discovery operation or for the other SL transmission and reception operations;

selecting the first resource pool for the signal transmission or reception based on a determination that the signal transmission or reception is for the SL relay discovery operation;

selecting the second resource pool for the signal transmission or reception based on a determination that the signal transmission or reception is for the other SL transmission and reception operations;

receiving a SL relay discovery solicitation message from a remote UE;

identifying, based on the SL relay discovery solicitation message received by the UE, (i) a requested relay service code (RSC) or SL relay UE identifier (ID) of the remote UE and (ii) whether an indication of a type of a SL relay operation that the remote is interested in is present in the SL relay discovery solicitation message;

determining, based on no indication of the type of the SL relay operation that the remote UE is interested in being present in the SL relay discovery solicitation message, the type of the SL relay operation for the remote UE corresponding the requested RSC or SL relay UE ID of the remote UE that is supported by the UE;

selecting, based on the determined type of a SL relay operation for the remote UE, the third or fourth resource pool, wherein the type of the SL relay operation is a layer 2 UE to network (L2 UE2NW) relay or a layer 2 UE to UE (L2 UE2UE) relay; and performing the signal transmission or reception using the selected one of the first and second resource pools.

7. The method of claim 6, further comprising:

receiving configuration information to identify a type of the SL relay operation that the remote UE is interested in; or identifying, based on pre-configuration information, the type of the SL relay operation that the remote UE is interested in, and wherein the configuration information or the pre-configuration information indicates a type of SL relay linked to the RSC.

8. The method of claim 6, further comprising:

transmitting, to the remote UE, a SL relay discovery response message including an indication of the determined type of the SL relay operation for the remote UE corresponding the requested RSC or SL relay UE ID of the remote UE that is supported by the UE.

9. The method of claim 6, further comprising:

transmitting, to the remote UE, a SL relay discovery announcement message including at least one of a RSC, an SL relay UE ID, an indication of an available type of SL relay, and announcing user information; and wherein the SL relay discovery announcement message from the UE indicates a type of SL relay operation that the UE supports.

10. The method of claim 6, further comprising:

transmitting, to the remote UE, a SL relay discovery response message including at least one of a RSC, an SL relay UE ID, and an indication of an available type of SL relay; and wherein the SL relay discovery response message indicates a type of SL relay operation that the UE supports.

11. A base station (BS) in a wireless communication system, the BS comprising:

a processor configured to generate a first resource pool for a sidelink (SL) relay discovery operation and a second resource pool for other SL transmission and reception operations, wherein the first resource pool comprises third and fourth resource pools; and a transceiver operably coupled to the processor, the transceiver configured to transmit information including the first resource pool for the SL relay discovery operation and the second resource pool for the other SL transmission and reception operations, wherein:

the first resource pool is selected for a signal transmission or reception for the SL relay discovery operation, the second resource pool is selected for the signal transmission or reception for the other SL transmission and reception operations, the third or fourth resource pool is selected based on a type of a SL relay operation that a remote user equipment (UE) is interested in, the type of a SL relay operation for the remote UE is determined (a) based on a SL relay discovery solicitation message transmitted by the remote UE that includes (i) a requested relay service code (RSC) or SL relay UE identifier (ID) of the remote UE and (ii) no an indication of a type of a SL relay operation that the remote UE is interested in is present in the SL relay discovery solicitation message and (b) as corresponding the requested RSC or SL relay UE ID of the remote UE that is supported by a UE that received the SL relay discovery solicitation message, and the type of the SL relay operation is a layer 2 UE to network (L2 UE2NW) relay or a layer 2 UE to UE (L2 UE2UE) relay.

12. The BS of claim 11, wherein:

the processor is further configured to generate configuration information for identifying the type of the SL relay operation that the remote UE is interested in;

the transceiver is further configured to transmit the configuration information; and the configuration information indicates a type of SL relay linked to the RSC.

13. The BS of claim 11, wherein the UE transmits, to the remote UE, a SL relay discovery response message that includes an indication of the determined type of the SL relay operation for the remote UE corresponding the requested RSC or SL relay UE ID of the remote UE that is supported by the UE.

14. The BS of claim 11, wherein:

a SL relay discovery announcement message from the UE includes at least one of a RSC, a SL relay UE ID, an indication of an available type of SL relay, and announcing user information; and the SL relay discovery announcement message indicates a type of the SL relay operation that the UE supports.

15. The BS of claim 11, wherein:

a SL relay discovery response message from the UE includes at least one of a RSC, a SL relay UE ID, and an indication of an available type of SL relay; and the SL relay discovery response message indicates a type of SL relay operation that the UE supports.

* * * * *